United States Patent
Kojima et al.

(10) Patent No.: US 10,731,717 B2
(45) Date of Patent: Aug. 4, 2020

(54) POWER TRANSMISSION DEVICE FOR VEHICLE

(71) Applicant: HONDA MOTOR CO., LTD., Minato-ku, Tokyo (JP)

(72) Inventors: Hiroyuki Kojima, Wako (JP); Yoshiaki Kazama, Wako (JP); Hirohisa Takahashi, Wako (JP); Takashi Tetsuka, Wako (JP); Kenta Shuto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/937,920

(22) Filed: Mar. 28, 2018

(65) Prior Publication Data

US 2018/0283476 A1 Oct. 4, 2018

(30) Foreign Application Priority Data

Mar. 31, 2017 (JP) ................................ 2017-073014
Mar. 31, 2017 (JP) ................................ 2017-073030

(51) Int. Cl.
*F16H 59/02* (2006.01)
*F16D 48/06* (2006.01)

(52) U.S. Cl.
CPC ........ *F16D 48/06* (2013.01); *F16D 2500/104* (2013.01); *F16D 2500/1045* (2013.01);
(Continued)

(58) Field of Classification Search
CPC .................................................. F16H 59/0204
See application file for complete search history.

(56) References Cited

U.S. PATENT DOCUMENTS 5,444,623 A 8/1995 Genise
8,515,638 B2 * 8/2013 Saitoh ..................... F16D 48/06
192/31
(Continued)

FOREIGN PATENT DOCUMENTS

EP 2253861 11/2010
EP 2325513 5/2011
(Continued)

OTHER PUBLICATIONS

Japanese Office Action for Japanese Patent Application No. 2017-073030 dated Mar. 5, 2019.
(Continued)

*Primary Examiner* — Tisha D Lewis
(74) *Attorney, Agent, or Firm* — Amin, Turocy & Watson, LLP

(57) ABSTRACT

A power transmission device for a vehicle includes a control unit adapted to automatically control engagement or disengagement of a clutch, and is further equipped with a clutch lever for manually engaging or disengaging the clutch. The power transmission device includes a manual mode in which the clutch is engaged or disengaged by a driver performing an engagement or disengagement operation with the clutch engagement/disengagement operating element and an automatic mode in which the clutch is engaged or disengaged under the control of the control unit without the driver performing the engagement or disengagement operation. The manual mode or the automatic mode is selectable by the driver. In the manual mode, it is further possible to select a plurality of control modes with differing levels of intervention of the automatic control.

5 Claims, 21 Drawing Sheets

(52) U.S. Cl.
CPC ............ *F16D 2500/10412* (2013.01); *F16D 2500/1117* (2013.01); *F16D 2500/3067* (2013.01); *F16D 2500/314* (2013.01); *F16D 2500/50203* (2013.01); *F16D 2500/50239* (2013.01); *F16D 2500/50858* (2013.01); *F16D 2500/5122* (2013.01); *F16D 2500/70426* (2013.01); *F16D 2500/70454* (2013.01)

(56) References Cited

U.S. PATENT DOCUMENTS

| | | | |
|---|---|---|---|
| 2008/0060900 A1* | 3/2008 | Pick | F16D 25/086 192/83 |
| 2009/0222182 A1* | 9/2009 | Tomoda | F16D 25/086 701/67 |
| 2010/0209892 A1* | 8/2010 | Lin | G09B 9/05 434/71 |
| 2010/0211270 A1 | 8/2010 | Chin et al. | |
| 2010/0298094 A1* | 11/2010 | Oda | F16D 48/064 477/179 |
| 2012/0239264 A1* | 9/2012 | Kojima | F16H 61/16 701/53 |
| 2016/0232722 A1 | 8/2016 | Morishima | |

FOREIGN PATENT DOCUMENTS

| | | |
|---|---|---|
| EP | 2557012 | 2/2013 |
| JP | 05-203031 | 8/1993 |
| JP | 2005-214370 | 8/2005 |
| JP | 2006-232174 | 9/2006 |
| JP | 2006-292055 | 10/2006 |
| JP | 2009-079607 | 4/2009 |
| JP | 2013-204791 | 10/2013 |
| JP | 2015-071329 | 4/2015 |
| JP | 2015-108453 | 6/2015 |
| JP | 2016-186348 | 10/2016 |
| JP | 2017-173419 | 9/2017 |
| JP | 2018-037002 | 3/2018 |
| WO | 2012/164717 | 12/2012 |

OTHER PUBLICATIONS

Japanese Office Action for Japanese Patent Application No. 2017-073014 dated Oct. 9, 2018.
Extended European Search Report for European Patent Application No. 18164510.2 dated Sep. 11, 2018.

* cited by examiner

FIG. 7

| GEAR POSITION | ODD-NUMBERED STAGE SIDE GEAR STATE | EVEN-NUMBERED STAGE SIDE GEAR STATE |
|---|---|---|
| N-N | N | N |
| 1-N | 1 | N |
| 1-2 | 1 | 2 |
| N-2 | N | 2 |
| 3-2 | 3 | 2 |
| 3-N | 3 | N |
| 3-4 | 3 | 4 |
| N-4 | N | 4 |
| 5-4 | 5 | 4 |
| 5-N | 5 | N |
| 5-6 | 5 | 6 |
| N-6 | N | 6 |

POWER TRANSMISSION DEVICE FOR VEHICLE

CROSS-REFERENCE TO RELATED APPLICATIONS

This application is based upon and claims the benefit of priority from Japanese Patent Applications No. 2017-073014 filed on Mar. 31, 2017 and No. 2017-073030 filed on Mar. 31, 2017, the contents all of which are incorporated herein by reference.

BACKGROUND OF THE INVENTION

Field of the Invention

The present invention relates to a power transmission device for a vehicle, and more particularly, relates to a power transmission device for a vehicle that carries out engagement or disengagement of power with an automatic control using a clutch-by-wire technique or the like.

Description of the Related Art

In recent years, widespread use of automatic transmission technologies for straddle type vehicles has progressed. On the other hand, in saddle type vehicles, there is a desire to enjoy driving. In Japanese Laid-Open Patent Publication No. 2009-079607, an automatic transmission device for a motorcycle is disclosed in which, in particular, a clutch, which is operated automatically by an automatic shift control, can also be operated manually in accordance with a selection of a driver.

SUMMARY OF THE INVENTION

However, heretofore, in the case that a clutch operation performed by an automatic control is switched over to a manually performed clutch operation, only one manual clutch operating mode has been available, and no room for selection has been offered to the driver.

On the other hand, due to diversification of motorcycle enthusiasts, for people who wish to enjoy manual clutch operations comfortably on a suburban road or the like, for people who wish to acquire mastery of precise clutch operations such as in circuit racing, or alternatively, for beginning drivers and skilled drivers, a manual clutch operating mode has been desired which can be appropriately selected depending on diversity of tastes and differences in driving skill, and the like.

The present invention has been devised in consideration of the aforementioned problems, and has the object of providing a power transmission device for a vehicle, which is capable of appropriately coping with diversity and differing levels of skill of drivers who seek enjoyment of manual clutch operations.

The present invention includes the following features or aspects.

First Aspect: A power transmission device for a vehicle equipped with a control unit adapted to automatically control engagement or disengagement of a clutch, the power transmission device for the vehicle comprising a clutch engagement/disengagement operating element adapted to engage or disengage the clutch manually, and further including a manual mode in which the clutch is engaged or disengaged by a driver performing an engagement or disengagement operation with the clutch engagement/disengagement operating element (L) and an automatic mode in which the clutch is engaged or disengaged under the control of the control unit without the driver performing the engagement or disengagement operation, wherein, the manual mode or the automatic mode is selectable by the driver and in the manual mode, it is further possible to select a plurality of control modes having differing levels of intervention of the automatic control.

In accordance with the first aspect, an appropriate manual engagement/disengagement shift control mode for a clutch can be selected depending on a plurality of uses, such as for people who wish to enjoy shifting by manual clutch operations, people who desire more practice, or the like.

Second Aspect: The plurality of control modes having differing levels of intervention of the automatic control include at least a mode having a driving assist control for reducing shocks at a time of engagement of the clutch, and a mode that allows shocks to occur at the time of engagement.

In accordance with the second aspect, even if the level of skill, or alternatively for various situations, a mode in which the clutch operation can be comfortably performed, and a mode in which a precise clutch engagement/disengagement operation is required such as in circuit racing or the like can be selected according to various situations, such as the level of skill, the type of roadway, or the like.

Third Aspect: In the mode that allows shocks to occur at the time of engagement, a control is activated to avoid a specified limiting event in the state of the engine of the vehicle.

In accordance with the third aspect, even in the mode in which a precise clutch engagement/disengagement operation is required, in the case of the predetermined limiting event, it is possible to assist driving by the driver, or to automatically provide protection to the vehicle.

Fourth Aspect: The limiting event is an event to continue with half-clutching for a predetermined time period or greater.

In accordance with the fourth aspect, the clutch device can be appropriately protected, even in the mode in which a precise clutch engagement/disengagement operation is required.

Fifth Aspect: The limiting event is an event in which the engine rotational speed is less than or equal to a predetermined value.

In accordance with the fifth aspect, it is possible to appropriately avoid an engine stop (so called engine stalling), even in the mode in which a precise clutch engagement/disengagement operation is required.

Sixth Aspect: A driving skill determining device is included, which is incorporated in the control unit installed in the vehicle, and operated in accordance with a selection indication of the driver.

In accordance with the sixth aspect, it is possible to determine the driving skill of the driver by effectively using a sensor or the like utilized in the control unit.

Seventh Aspect: The driving skill determining device operates in accordance with the selection indication of the driver when the manual mode is selected.

In accordance with the seventh aspect, it is possible to determine the driving skill of the driver by effectively using a sensor or the like utilized in the control unit that enables the manual mode to be selected.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a listing of shift positions defined by the shift drum;

DESCRIPTION OF THE PREFERRED EMBODIMENTS

An embodiment of a power transmission device for a vehicle according to the present invention will be described below with reference to FIGS. 1 through 21.

Figure 1:
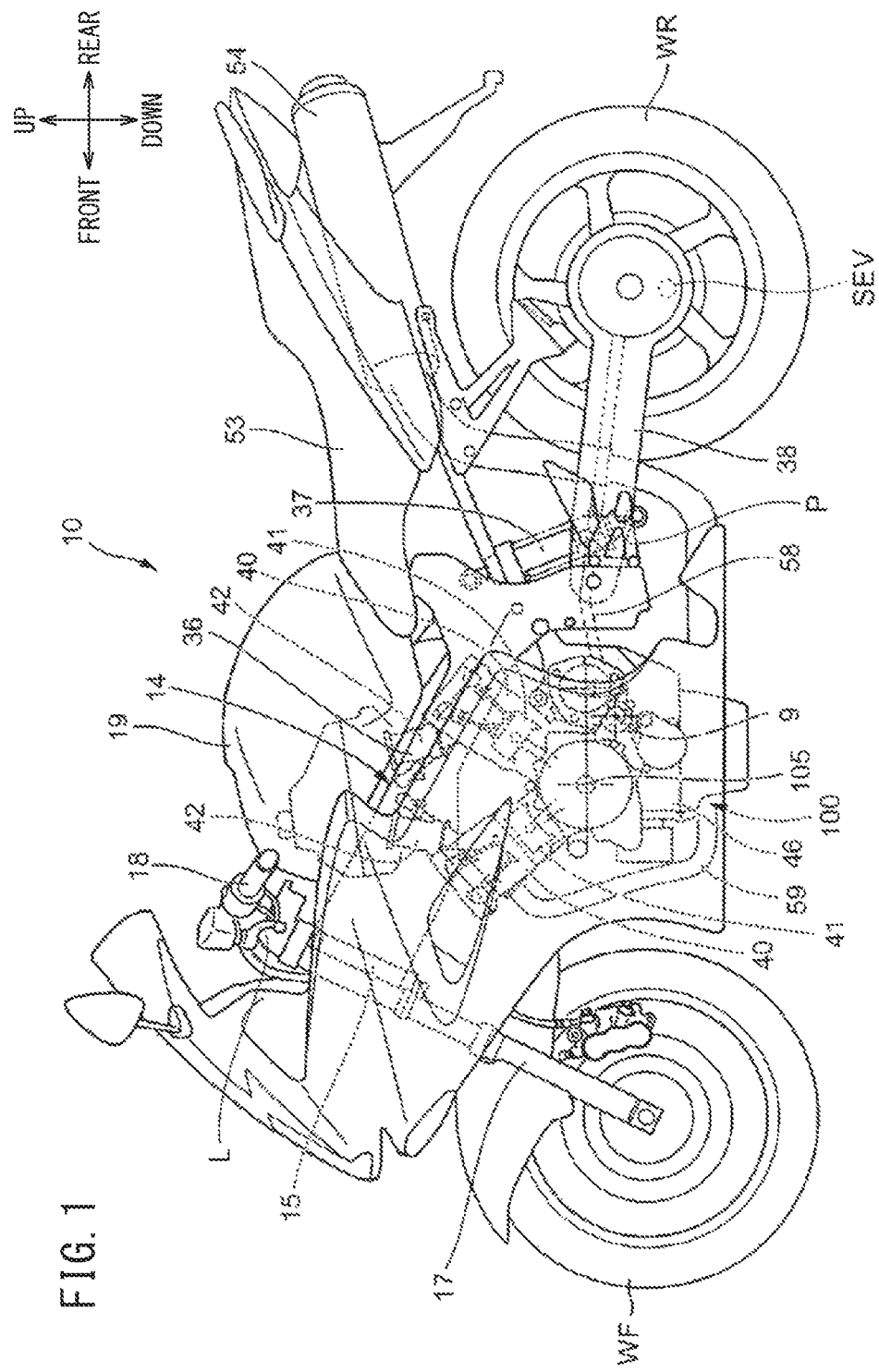
FIG. 1 is a left side view of a saddle-riding type vehicle (hereinafter referred to as a vehicle) on which a power transmission device according to the present embodiment is mounted.
Figure 2:
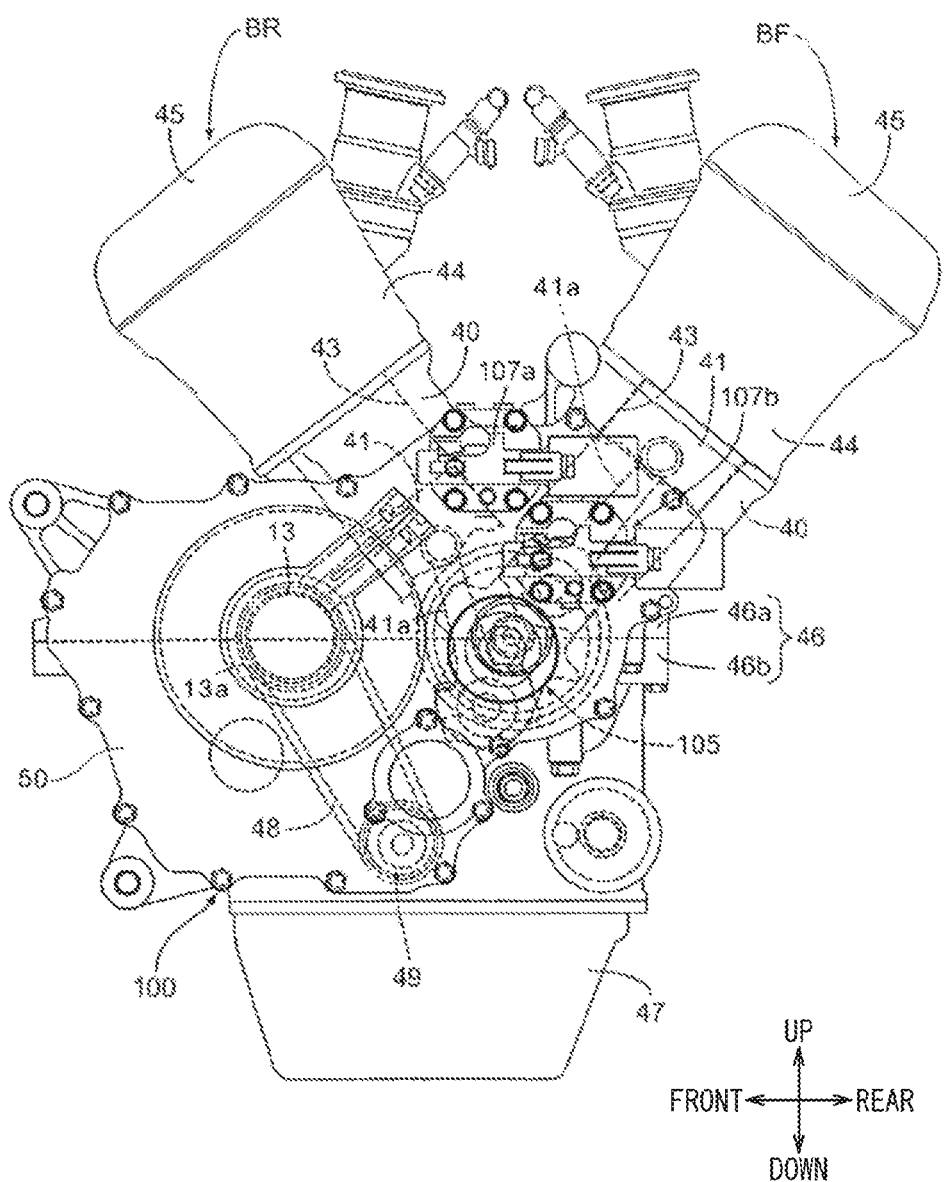
FIG. 2 is a right side view of an engine serving as a power source for the vehicle.

FIG. 1 is a left side view of a saddle-riding type vehicle (hereinafter referred to as a vehicle 10) on which a power transmission device according to the present embodiment is mounted. FIG. 2 is a right side view of an engine 100 serving as a power source for the vehicle 10. A vehicle body frame 14 of the vehicle 10 includes a pair of right and left main pipes 36, and a head pipe 15 is disposed on a vehicle body front side of the main pipes 36. A pair of left and right front forks 17, which rotatably support a front wheel WF together with supporting a steering handle 18, are supported rotatably with respect to the head pipe 15.

The engine 100, which is suspended below the main pipes 36, is a V-type 4-cylinder engine in which the front and rear cylinders thereof are arranged at a predetermined nip angle. The pistons 41 that slide inside the cylinder block 40, the valve operating mechanisms, and the like have the same configuration in all of the four cylinders. A crankshaft 105 which rotatably supports a connecting rod 41a (see FIG. 2) supporting the pistons 41, a main shaft 13 (see FIG. 2) to which a plurality of gear pairs constituting the transmission are attached, and a countershaft 9 are accommodated respectively in a crankcase 46.

Between the front and rear cylinder blocks, air funnels 42 are arranged for introducing fresh air, which has passed through an air cleaner box disposed in a lower part of a fuel tank 19, into intake ports of the respective cylinders. Fuel injection valves are attached to each of the air funnels 42. A muffler 54 for discharging combustion gas that has been guided by an exhaust pipe 59 to the rear of the vehicle body is disposed below the seat 53.

A swing arm 38, which is suspended by a shock unit 37 and rotatably supports the rear wheel WR, is swingably supported at a lower rear portion of the main pipes 36. A drive shaft 58 is arranged inside the swing arm 38, and transmits a rotational driving force of the engine 100, which is output from the countershaft 9, to the rear wheel WR. In the vicinity of the axle of the rear wheel WR, a vehicle velocity sensor SEV is provided, which detects the rotational velocity of the rear wheel WR.

A clutch lever L, which serves as a manual clutch operating means for engagement and disengagement of a driving force transmission between the engine 100 and the rear wheel WR, is attached to the left side of the steering handle 18 in the vehicle widthwise direction. A shift pedal P, which serves as a manual shifting means for performing a speed change of the transmission TM, is attached in the vicinity of a left footrest step in the vehicle widthwise direction.

As shown in FIG. 2, a front bank BF and a rear bank BR constituting the engine 100 are made up respectively from a cylinder head 44 mounted on an upper side of the cylinder block 40 and housing a valve train mechanism therein, and a head cover 45 that covers an upper end of the cylinder head 44. The pistons 41 slide on inner circumferential portions of cylinders 43 that are formed in the cylinder block 40. The crankcase 46 is constituted from an upper side case half 46a molded integrally together with the cylinder block 40, and a lower side case half 46b to which an oil pan 47 is attached.

A water pump 49 for pressure-feeding cooling water is driven rotatably by an endless chain 48 which is wrapped around a sprocket 13a formed on the main shaft 13. A clutch cover 50 is attached to the right side surface in the vehicle widthwise direction of the crankcase 46.

In a power transmission device 300 (see FIG. 3) of the engine 100 according to the present embodiment, a twin clutch type of clutch including a first clutch and a second clutch is applied to a hydraulic clutch that carries out engagement and disengagement of a rotary driving force with the transmission. A hydraulic pressure supplied to the twin clutch TCL can be controlled by an actuator, and a first valve 107a and a second valve 107b serving as actuators for controlling both clutches are attached to a right side portion of the engine 100. The twin clutch TCL is engageably and disengageably driven by a combination of an automatic control according to the engine rotational speed Ne, the vehicle velocity and the like, and drive commands of the vehicle occupant by operating the clutch lever L.

Figure 3:
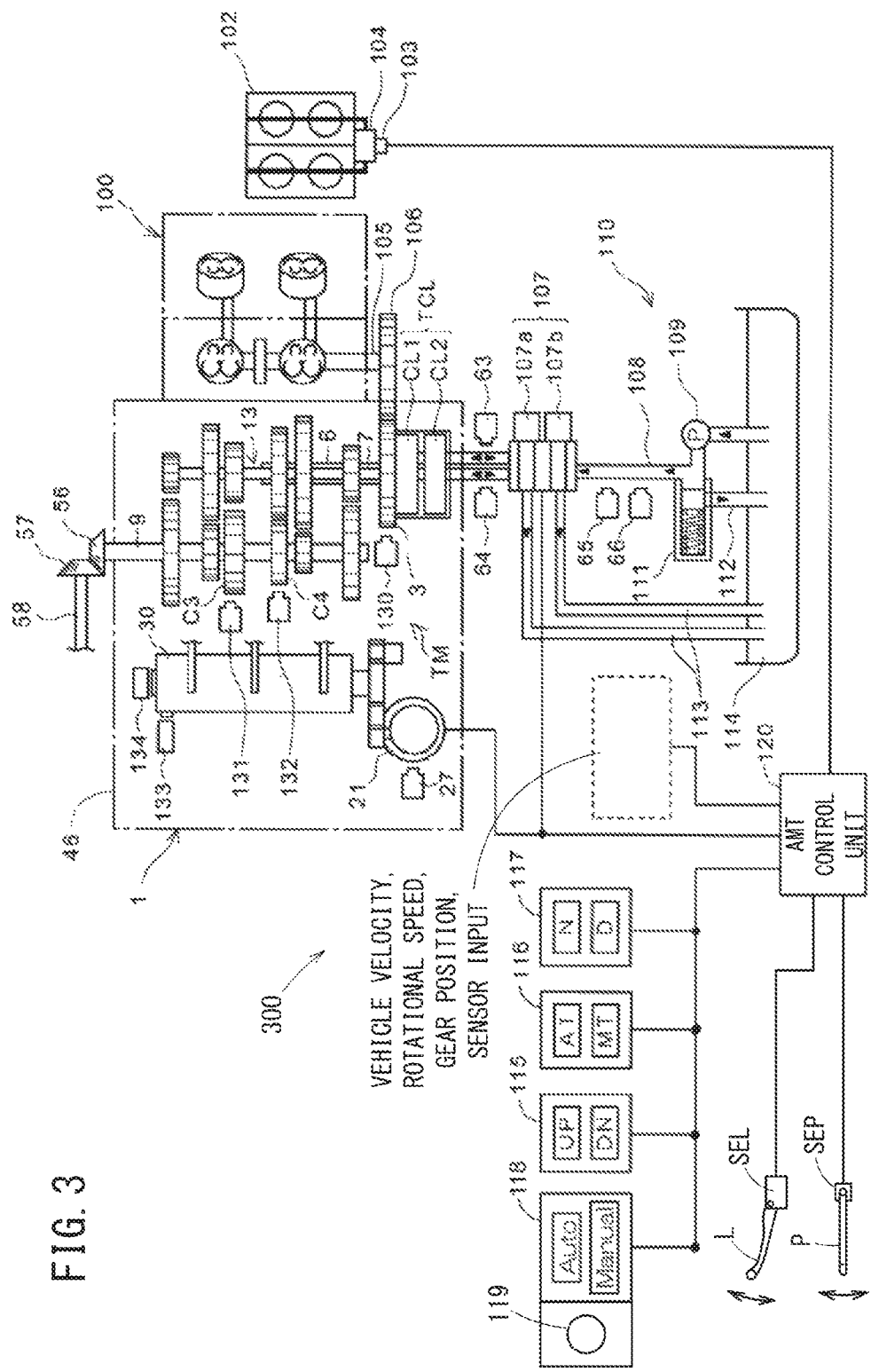
FIG. 3 is a system configuration diagram of an automatic/manual transmission and peripheral devices of the power transmission device according to the present embodiment.

The power transmission device 300 shown in FIG. 3 is illustrated in the form of a system configuration diagram of an automatic/manual transmission (referred to hereinafter as an AMT) 1 as an automatic transmission, and peripheral devices thereof. The AMT 1 is a twin clutch type of automatic transmission control device that engages and disengages the rotational driving force of the engine 100 by the two clutches disposed on the main shaft. The AMT 1, which is housed in the crankcase 46, is driven and controlled by a hydraulic clutch device 110 and an AMT control unit 120. The AMT control unit 120 includes a clutch control device adapted to drive and control valves 107 that serve as clutch actuators including the first valve 107a and the second valve 107b. Further, the engine 100 also includes a throttle-by-wire type of throttle body 102 equipped with a throttle valve motor 104 that opens and closes the throttle valve.

The AMT 1 comprises the twin clutch TCL which is made up from a forward six-stage transmission TM, a first clutch CL1, and a second clutch CL2, a shift drum 30, and a shift motor (shift actuator) 21 that rotates the shift drum 30. The shift motor 21 is rotatably driven by a combination of an automatic control according to the engine rotational speed Ne, the vehicle velocity and the like, and drive commands of the vehicle occupant by operating the shift pedal P.

A large number of gears constituting the transmission TM are coupled or loosely fitted, respectively, to the main shaft 13 and the countershaft 9. The main shaft 13 is made up from an inner main shaft 7 and an outer main shaft 6. The inner main shaft 7 is coupled to the first clutch CL1, whereas the outer main shaft 6 is coupled to the second clutch CL2. The main shaft 13 and the countershaft 9 are provided with transmission gears which are displaceable in the axial direction of the main shaft 13 and the countershaft 9, respectively, and the ends of the shift forks 71, 72, 81, 82 (see FIG. 5) are engaged respectively with a plurality of guide grooves formed in the transmission gears and the shift drum 30.

A primary drive gear 106 is coupled to the crankshaft 105 of the engine 100, and the primary drive gear 106 is enmeshed with a primary driven gear 3. The primary driven gear 3 is connected to the inner main shaft 7 via the first clutch CL1, and is connected to the outer main shaft 6 via the second clutch CL2. Further, the AMT 1 is equipped with an inner main shaft RPM (rotational speed) sensor 131 and an outer main shaft RPM (rotational speed) sensor 132 for detecting rotational speeds of the inner main shaft 7 and the outer main shaft 6, respectively, by measuring the rotational speed of a predetermined transmission gear on the countershaft 9.

An inner main shaft rotational speed sensor 131 is engaged with a transmission gear mounted non-rotatably on the inner main shaft 7, and detects the rotational speed of a driven side transmission gear C3, which is rotatable with respect to the countershaft 9 and is mounted thereon in a non-slidable manner. Further, an outer main shaft rotational speed sensor 132 is engaged with a transmission gear mounted non-rotatably on the outer main shaft 6, and detects the rotational speed of a driven side transmission gear C4, which is rotatable with respect to the countershaft 9 and is mounted thereon in a non-slidable manner.

A bevel gear 56 is connected to an end of the countershaft 9. The bevel gear 56 is enmeshed with another bevel gear 57 coupled to the drive shaft 58, whereby the rotational driving force of the countershaft 9 is transmitted to the rear wheel WR. An engine rotational speed sensor 130, which is arranged in facing relation to the outer circumference of the primary driven gear 3, and a gear position sensor 134, which detects a gear position of the transmission TM on the basis of the rotational position of the shift drum 30, are provided inside the AMT 1. A shifter sensor 27, which detects the rotational position of a shifter 25 that is driven by the shift motor 21, and a neutral switch 133, which detects that the shift drum 30 is in a neutral position, are further provided inside the AMT 1. A throttle opening sensor 103 adapted to detect a throttle opening is disposed on the throttle body 102.

The hydraulic clutch device 110 includes a configuration that utilizes both the lubricating oil of the engine 100, and the operating oil that drives the twin clutch TCL. The hydraulic clutch device 110 includes an oil tank 114, and piping 108 for feeding the oil (hydraulic oil) in the oil tank 114 to the first clutch CL1 and the second clutch CL2. A hydraulic pump 109 serving as a hydraulic pressure supply source, and valves (electromagnetic control valves) 107 serving as clutch actuators are provided on the piping 108. A regulator 111 for keeping the hydraulic pressure supplied to the valves 107 at a constant value is arranged on a return conduit 112 connected to the piping 108. The valves 107 are made up from the first valve 107a and the second valve 107b which are capable of individually applying hydraulic pressure to the first clutch CL1 and the second clutch CL2, and a return conduit 113 for the oil is provided in each of the valves 107.

A first hydraulic pressure sensor 63 for measuring the hydraulic pressure generated in the conduit, and more specifically, the hydraulic pressure generated in the first clutch CL1, is provided in a conduit connecting the first valve 107a and the first clutch CL1. Similarly, a second hydraulic pressure sensor 64 for measuring the hydraulic pressure generated in the second clutch CL2 is provided in a conduit connecting the second valve 107b and the second clutch CL2. Furthermore, a main hydraulic pressure sensor 65 and an oil temperature sensor serving as an oil temperature detecting means are provided in the piping 108 that connects the hydraulic pump 109 and the valves 107.

An automatic transmission mode processing unit AT, a manual transmission mode processing unit MT, a transmission mode changeover switch 116, a shift switch 115 serving as a manual shifting means, a neutral select switch 117, and a clutch control mode changeover switch 118 are connected to the AMT control unit 120.

The automatic transmission mode processing unit AT performs processing in the automatic transmission mode of the transmission TM. The manual transmission mode processing unit MT performs processing in the manual transmission mode of the transmission TM. The transmission mode changeover switch 116 switches between the automatic transmission mode and the manual transmission mode. The shift switch 115 issues transmission commands to upshift (UP) or downshift (DN). The neutral select switch 117 switches between neutral (N) and drive (D). The clutch control mode changeover switch 118 switches between control modes of the clutch operations.

In the manual transmission mode, there are included a manual clutch operating mode and an automatic clutch control mode. The manual clutch operating mode is a mode in which the driver can operate the clutch lever L in order to engage or disengage the power. The automatic clutch control mode is a mode in which, when a shift operation is performed manually (including operations by the foot) by the later-described shift pedal P or the shift switch 115 and without operating the clutch lever L, engagement and disengagement of the clutch is carried out automatically.

The clutch control mode changeover switch 118 is a pushbutton type of switch, which is switched from off to on only while it is being pressed, and which under predetermined conditions, is capable of arbitrarily switching between an automatic clutch control mode for automatically performing the clutch control, and a manual clutch operating mode in which the clutch is driven in accordance with operations of the clutch lever L. Further, the clutch control mode changeover switch 118 includes a direct switching button 119. The direct switching button 119 will be described later. Moreover, the respective switches and the direct switching button 119 are provided on a handle switch of the steering handle 18.

The shift pedal P is not connected mechanically to the shift drum 30, but is connected electrically to the AMT control unit 120 via a shift pedal operation amount sensor SEP. More specifically, similar to the shift switch 115, the shift pedal P functions as a switch that transmits a speed change request signal with respect to the AMT control unit 120. Further, the clutch lever L is not connected mechanically to the twin clutch TCL, but is electrically connected to the AMT control unit 120 via a clutch lever operation amount sensor SEL. More specifically, the clutch lever L functions as a switch that transmits a clutch operation request signal, and a signal corresponding to an amount at which the clutch lever L is operated is input to the AMT control unit 120.

The AMT control unit 120 comprises a central processing unit (CPU), controls the valves (clutch actuators) 107 and the shift motor (shift actuator) 21 in accordance with output signals from the aforementioned respective sensors and switches, and automatically or semi-automatically switches the gear stages of the AMT 1. When the AT mode is selected, the gear stages are automatically switched in accordance with information such as the vehicle velocity, the engine rotational speed Ne, the throttle opening, etc. On the other hand, when the MT mode is selected, the transmission TM is shifted up or shifted down in accordance with operations of the shift switch 115 or the shift pedal P. Moreover, a configuration is provided in which, even when the MT mode is selected, it is possible for an auxiliary automatic transmission control to be executed for preventing excessive rotation and stalling of the engine 100.

In the hydraulic clutch device 110, hydraulic pressure is applied to the valves 107 by the hydraulic pump 109, and the hydraulic pressure is controlled by the regulator 111 in a manner so that the hydraulic pressure does not exceed an upper limit value. When the valves 107 are opened in accordance with a command from the AMT control unit 120, the hydraulic pressure is applied to the first clutch CL1 or the second clutch CL2, whereupon the primary driven gear 3 is connected to the inner main shaft 7 or the outer main shaft 6 via the first clutch CL1 or the second clutch CL2. More specifically, both the first clutch CL1 and the second clutch CL2 are normally open type hydraulic clutches, and when the valves 107 are closed and application of the hydraulic pressure is stopped, by return springs (not shown) incorporated therein, the first clutch CL1 and the second clutch CL2 are urged in a direction to disengage the connection with the inner main shaft 7 and the outer main shaft 6.

The valves 107 drive both clutches by opening and closing a conduit connecting the piping 108 and both clutches. The valves 107 are configured so as to arbitrarily change a time period from the fully closed state to the fully open state of the conduit, by the AMT control unit 120 adjusting the drive signals thereto.

The shift motor 21 rotates the shift drum 30 in accordance with a command from the AMT control unit 120. When the shift drum 30 rotates, the shift forks 71, 72, 81, 82 are displaced in the axial direction of the shift drum 30, in accordance with the shapes of the guide grooves formed on the outer circumference of the shift drum 30. Accompanying such displacement, engagement between the countershaft 9 and the gears on the main shaft 13 changes.

With the AMT 1 according to the present embodiment, a configuration is provided in which the inner main shaft 7 coupled to the first clutch CL1 supports the odd-numbered gears (1st, 3rd, and 5th speed), and the outer main shaft 6 coupled to the second clutch CL2 supports the even-numbered gears (2nd, 4th, and 6th speed). Accordingly, for example, while traveling with the odd-numbered gears, supply of hydraulic pressure to the first clutch CL1 is continued and the state of connection is maintained. In addition, when a speed change is made, by performing a clutch switching operation in a state in which the transmission gears before and after the speed change are enmeshed, the transmission gear that transmits the driving force is switched.

Figure 4:
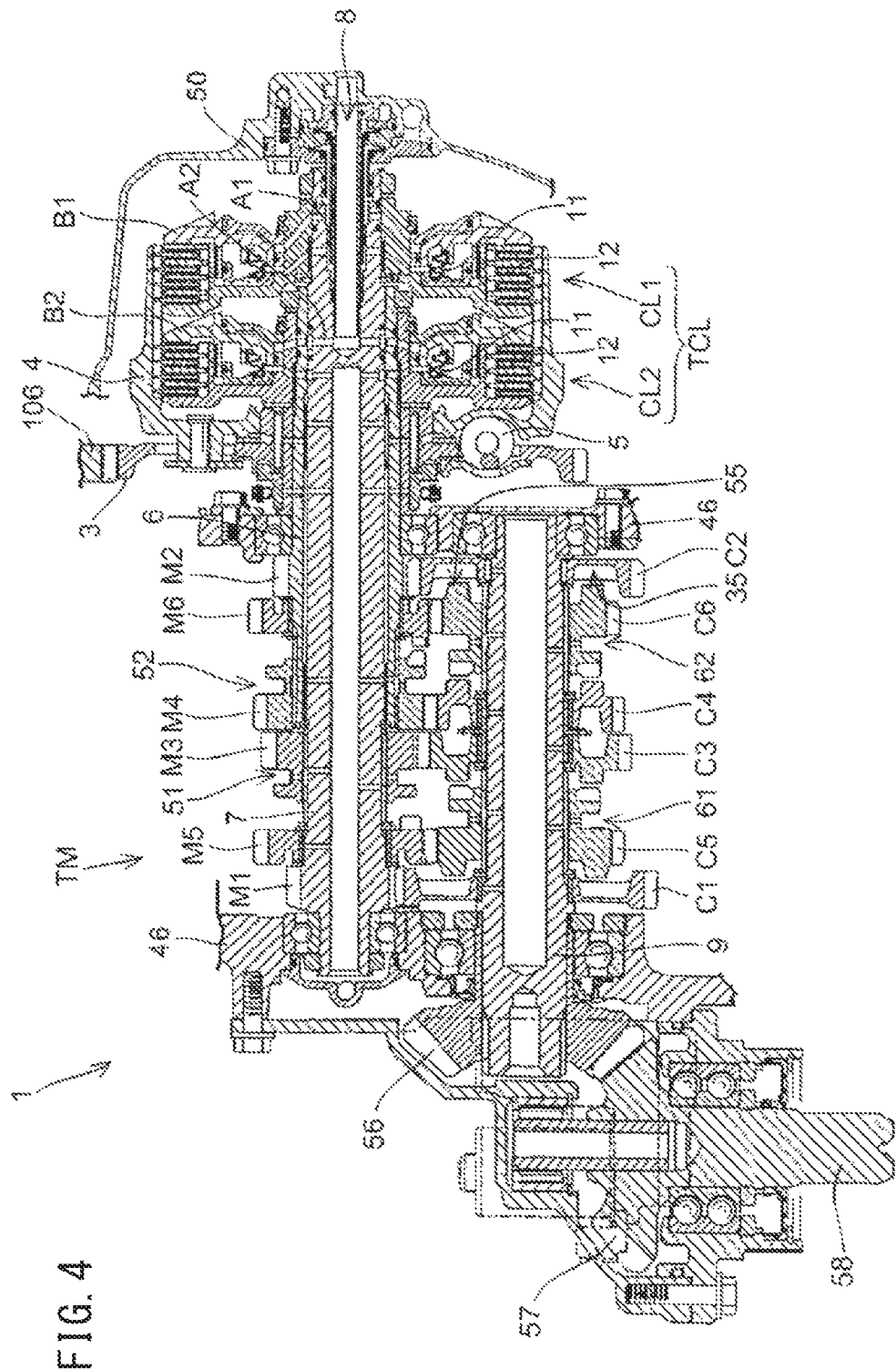
FIG. 4 is an enlarged cross-sectional view of the automatic/manual transmission of the power transmission device according to the present embodiment.

FIG. 4 is an enlarged cross-sectional view of the transmission TM. In the drawing, identical reference numerals denote identical or equivalent parts. A rotational driving force of the crankshaft 105 of the engine 100 is transmitted to the primary driven gear 3 via the primary drive gear 106. The primary driven gear 3 includes a shock absorbing mechanism 5. The rotational driving force is transmitted from the twin clutch TCL to the main shaft 13 (the outer main shaft 6 and the inner main shaft 7). The inner main shaft 7 is supported rotatably by the outer main shaft 6. In addition, the rotational driving force is output to the countershaft 9 via six pairs of gears disposed between the main shaft 13 and the countershaft 9. The bevel gear 56 is attached to the countershaft 9. With the bevel gear 56 enmeshing with the bevel gear 57, the direction of rotation of the rotational driving force is bent toward the rear of the vehicle body and the rotational driving force transmitted to the bevel gear 56 is transmitted to the drive shaft 58.

The transmission TM has six pairs of transmission gears between the main shaft 13 and the countershaft 9. In the transmission TM, in accordance with a combination of the position of the slidable gears mounted slidably in the axial direction of the respective shafts, and the state of engagement or disengagement of the first clutch CL1 and the second clutch CL2, it is possible to select via which of the gear pairs the rotational driving force is output. The twin clutch TCL is disposed in the interior of a clutch case 4 which rotates integrally with the primary driven gear 3. The first clutch CL1 is attached in a non-rotatable manner to the inner main shaft 7. The second clutch CL2 is attached in a non-rotatable manner to the outer main shaft 6. Between the clutch case 4 and both clutches, clutch plates 12 are disposed, which are made up from four driving friction plates which are supported non-rotatably by the clutch case 4, and four driven friction plates which are supported non-rotatably on both clutches.

The first clutch CL1 and the second clutch CL2 are constituted in a manner so that, when hydraulic pressure from the hydraulic pump 109 (see FIG. 3) is supplied thereto, frictional forces are generated in the clutch plates 12, and switching to the connected state is brought about. On a wall surface of the clutch cover 50 that is attached to the crankcase 46, a distributor 8, in which two double-tubular hydraulic paths are formed, is embedded in the inner main shaft 7. In addition, the hydraulic pressure is supplied to the distributor 8 by the first valve 107a, and the hydraulic pressure is supplied to an oil passage A1 formed in the inner main shaft 7. Consequently, a piston B1 slides to the left in the figure in opposition to a resilient force of an elastic member 11 such as a spring, whereby the first clutch CL1 is switched to the connected state. On the other hand, when the hydraulic pressure is supplied to an oil passage A2, a piston B2 slides to the left in the figure, whereby the second clutch CL2 is switched to the connected state. The pistons B1, B2 of both clutches CL1, CL2 are configured so that, when the hydraulic pressure is no longer applied, they are returned to their initial positions by the elastic force of the elastic members 11.

In accordance with the above-described configuration, the rotational driving force of the primary driven gear 3 merely rotates the clutch case 4, unless hydraulic pressure is supplied to the first clutch CL1 or the second clutch CL2. However, by supplying the hydraulic pressure, the outer main shaft 6 or the inner main shaft 7 is rotated integrally and driven together with the clutch case 4. In this case, by adjusting the magnitude of the supplied hydraulic pressure, it is possible to obtain an arbitrary half-clutched state.

The inner main shaft 7 connected to the first clutch CL1 supports the drive gears M1, M3, M5 of the odd-numbered gears (1st, 3rd, and 5th speeds). The first speed drive gear M1 is formed integrally with the inner main shaft 7. The third speed drive gear M3 is attached while being non-rotatable in the circumferential direction and being slidable in the axial direction by spline engagement. The fifth speed drive gear M5 is attached while being non-slidable in the axial direction, and rotatable in the circumferential direction.

On the other hand, the outer main shaft 6 connected to the second clutch CL2 supports the drive gears M2, M4, M6 of the even-numbered gears (2nd, 4th, and 6th speeds). The second speed drive gear M2 is formed integrally with the outer main shaft 6. The fourth speed drive gear M4 is attached while being non-rotatable in the circumferential direction and being slidable in the axial direction by spline engagement. The sixth speed drive gear M6 is attached while being non-slidable in the axial direction, and rotatable in the circumferential direction.

Further, the countershaft 9 supports the driven gears C1 to C6 that are enmeshed with the drive gears M1 to M6. The first through fourth speed driven gears C1 to C4 are attached while being non-slidable in the axial direction, and rotatable in the circumferential direction. The fifth and sixth speed driven gears C5, C6 are attached while being slidable in the axial direction and non-rotatable in the circumferential direction.

Among the aforementioned gear trains, the drive gears M3, M4 and the driven gears C5, C6, and more specifically, the "slidable gears" which are capable of sliding in the axial direction, are constituted so as to be moved slidably in accordance with operations of the shift forks, to be described later. Engagement grooves 51, 52, 61, 62 that engage respectively with claw members of the shift forks are formed in each of the slidable gears. Moreover, as noted above, the inner main shaft rotational speed sensor 131 (see FIG. 3) detects the rotational speed of the third speed driven gear C3. The outer main shaft rotational speed sensor 132 detects the rotational speed of the fourth speed driven gear C4.

Further, the transmission gears (drive gears M1, M2, M5, M6 and driven gears C1 to C4) other than the aforementioned slidable gears are "non-slidable gears" which are incapable of sliding in the axial direction. The non-slidable gears are configured to carry out engagement and disengagement of the rotational driving force with the adjacently positioned slidable gears. According to the above-described configuration, the twin clutch type transmission (AMT) 1 is capable of arbitrarily selecting one gear pair for transmitting the rotational driving force, through a combination of the positions of the slidable gears, and the state of engagement or disengagement of both clutches CL1, CL2.

According to the present embodiment, a dog clutch mechanism is applied to the transmission of the rotational driving force between the slidable gears and the non-slidable gears. In such a dog clutch mechanism, concave/convex shapes made up from dog teeth 55 and dog holes 35 enmesh with each other, and thereby enable transmission of the rotational driving force with less loss. According to the present embodiment, for example, four dog teeth 55 which are formed on the sixth speed driven gear C6 are configured to enmesh with four dog holes 35 that are formed in the second speed driven gear C2.

Figure 5:
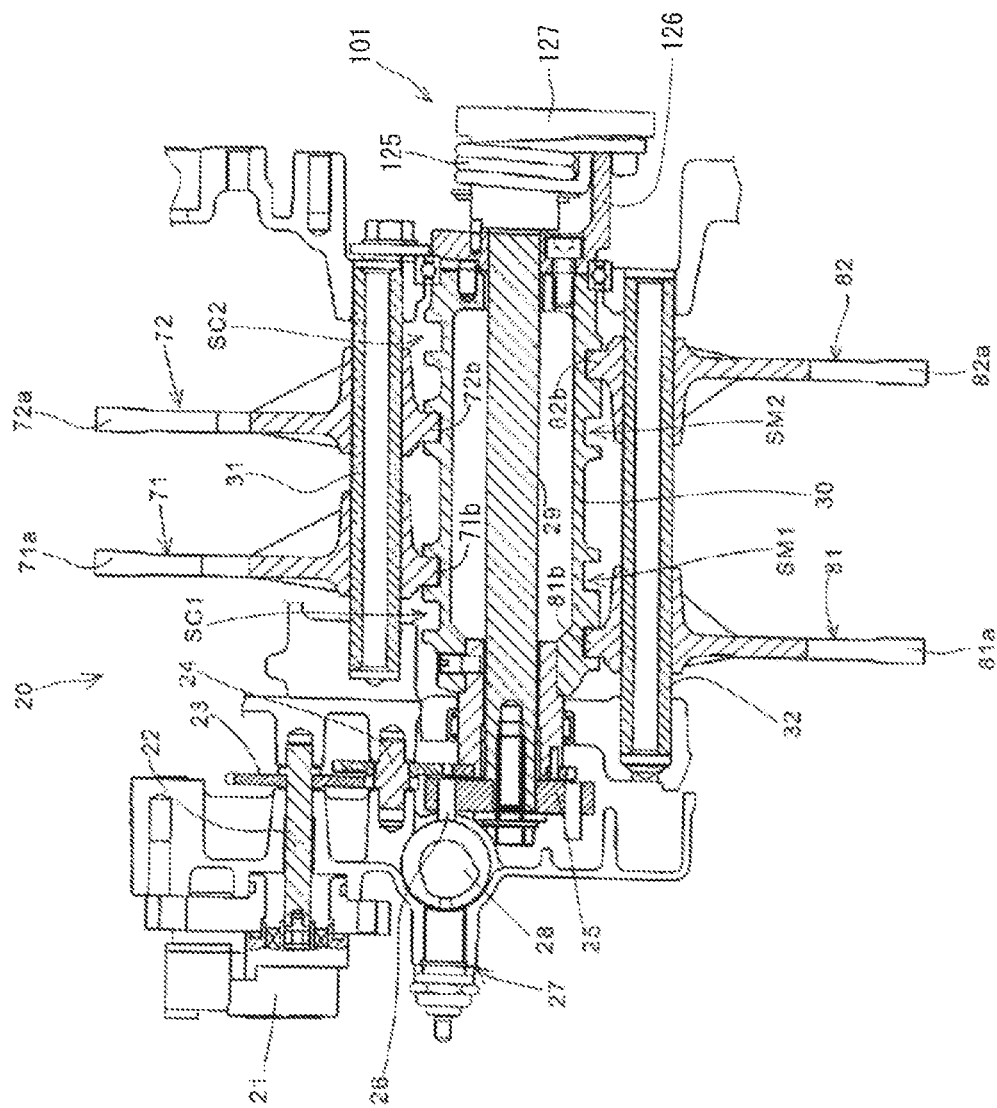
FIG. 5 is an enlarged cross-sectional view of a transmission mechanism.
Figure 6:
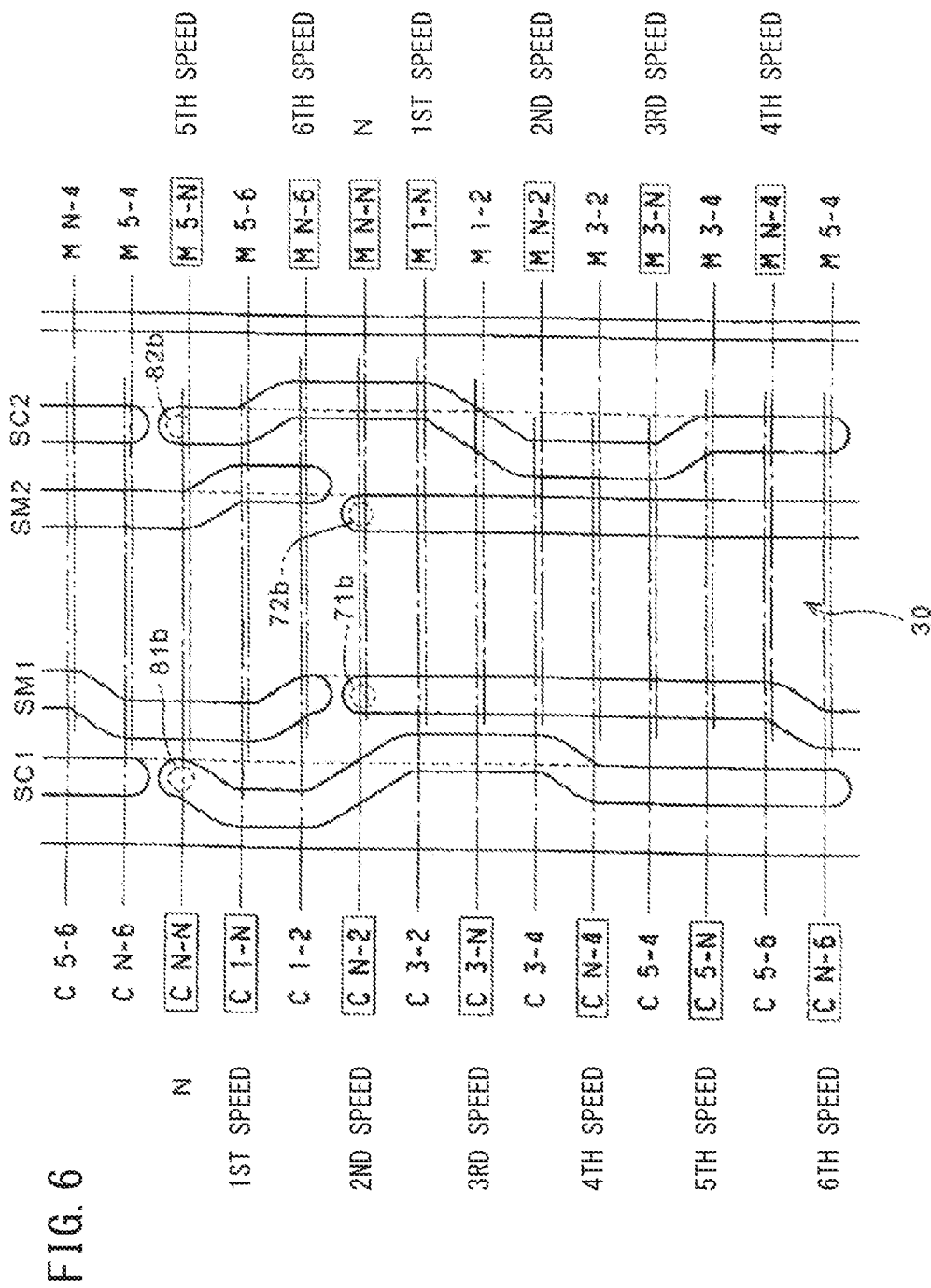
FIG. 6 is a developmental view showing the shapes of guide grooves of a shift drum.

FIG. 5 is an enlarged cross-sectional view of the transmission mechanism 20. Further, FIG. 6 is a developmental view showing the shapes of the guide grooves of the shift drum 30. In order to drive the aforementioned four slidable gears, the transmission mechanism 20 is equipped with four shift forks 71, 72, 81, 82 which are slidably attached to two guide shafts 31, 32. Guide claws (71a, 72a, 81a, 82a) for engagement with the slidable gears, and cylindrical convex portions (71b, 72b, 81b, 82b) for engagement with the guide grooves that are formed in the shift drum 30 are provided respectively on the four shift forks.

The shift fork 71 that engages with the third speed drive gear M3, and the shift fork 72 that engages with the fourth speed drive gear M4 are attached to the guide shaft 31. Further, the shift fork 81 that engages with the fifth speed driven gear C5, and the shift fork 82 that engages with the sixth speed driven gear C6 are attached to the guide shaft 32 on the other side.

The guide grooves SM1, SM2 and the guide grooves SC1, SC2 are formed on a surface of the shift drum 30 that is arranged in parallel with the guide shafts 31, 32. The shift forks 71, 72 on the side of the main shaft are engaged with the guide grooves SM1, SM2. The shift forks 81, 82 on the side of the countershaft are engaged with the guide grooves SC1, SC2. Consequently, accompanying rotational operation of the shift drum 30, the slidable gears M3, M4, C5, C6 are driven along the shapes of the four guide grooves.

The shift drum 30 is rotationally driven to a predetermined position by the shift motor 21. The rotational driving force of the shift motor 21 is transmitted to a shift drum shaft 29 that supports the hollow cylindrical shift drum 30, via a first gear 23 that is fixed to a rotating shaft 22, and a second gear 24 that is enmeshed with the first gear 23. The shift drum shaft 29 is connected to the shift drum 30 via a lost motion mechanism 101.

The lost motion mechanism 101 is a mechanism that connects the shift drum shaft 29 and the shift drum 30 via a torsion coil spring 125, in a manner so that an excessive load is not generated in the shift motor 21. For example, even in the case that the dog clutch is not in engagement, and the shift drum 30 cannot rotate as planned, movement of the shift motor 21 is temporarily absorbed by the torsion coil spring 125.

The lost motion mechanism 101 is constituted from a drive rotor 127 attached to an end of the shift drum shaft 29, a driven rotor 126 attached to an end portion of the shift drum 30, and the torsion coil spring 125 connecting the drive rotor 127 and the driven rotor 126. Consequently, when a state is brought about in which the shift drum 30 is rotatable under a condition in which movement of the shift motor 21 is temporarily absorbed, the shift drum 30 rotates to a predetermined position due to the elastic force of the torsion coil spring 125.

The gear position sensor 134 (see FIG. 3) is disposed so as to detect the angle of rotation of the shift drum 30 or the driven rotor 126, in order to detect the actual angle of rotation of the shift drum 30. The shifter sensor 27 is capable of detecting whether or not the shift motor 21 is at a predetermined position, on the basis of the position of a cam 28 that is rotated by a pin 26 embedded in the shifter 25 that is fixed to the shift drum shaft 29.

With reference to the developmental view shown in FIG. 6, a positional relationship between the rotational position of the shift drum 30 and the four shift forks will be described.

The guide shafts 31, 32 are disposed at positions separated by approximately 90° in the circumferential direction with respect to the axis of rotation of the shift drum 30. For example, in the case that the rotational position of the shift drum 30 is in neutral (N), the shift forks 81, 82 are at the position of the indication "C N-N" shown on the left side of the drawing. The shift forks 71, 72 are at the position of the indication "M N-N" shown on the right side of the drawing.

In the figure, the positions of the cylindrical convex portions (71b, 72b, 81b, 82b) of each of the shift forks at the time of neutral are indicated by dashed circles. Further, predetermined rotational positions continuing from the indication "C N-N" and downward therefrom on the left side of the drawing, and predetermined rotational positions continuing from the indication "M N-N" and downward therefrom on the right side of the drawing are disposed at intervals of 30 degrees, respectively. Moreover, in the present drawing, among the predetermined angles of rotation, later-described "neutral wait (N wait)" positions are shown surrounded by rectangles.

Concerning the slide positions of the shift forks as determined by the respective guide grooves, the guide grooves SM1, SM2 on the side of the main shaft are in two positions of a "left position" or a "right position". In the guide grooves SC1, SC2 on the side of the countershaft, there are three positions of a "left position" or a "middle position" or a "right position".

The respective shift forks when the shift drum 30 is in the neutral position are in the positions of the shift fork 81: middle position, the shift fork 82: middle position, the shift fork 71: right position, and the shift fork 72: left position. This provides a state in which the four slidable gears, which are driven respectively by each of the shift forks, are not enmeshed with their adjacent non-slidable gears. Accordingly, even if the first clutch CL1 or the second clutch CL2 is engaged, the rotational driving force of the primary driven gear 3 will not be transmitted to the countershaft 9.

Next, when the shift drum 30 is rotated from the aforementioned neutral position to the position ("C 1-N" and "M 1-N") corresponding to the first speed gear, the shift fork 81 is switched from the middle position to the left position, whereby the fifth speed driven gear C5 is switched from the middle position to the left position. In accordance therewith, the fifth speed driven gear C5 is enmeshed with the first speed driven gear C1 by the dog clutch, and a state is brought about in which the rotational driving force can be transmitted. In this state, when the first clutch CL1 is switched to the connected state, the rotational driving force is transmitted sequentially in order of the inner main shaft 7→the first speed drive gear M1→the first speed driven gear C1→the fifth speed driven gear C5→the countershaft 9.

In addition, when a shift command to second speed is input after completion of shifting to the first speed gear, the shift drum 30 is automatically rotated by 30 degrees in an upshifting direction. Such a rotational operation is referred to as an "upside preliminary speed change" for the purpose of completing gear shifting merely by switching the state of connection of the twin clutch TCL when the shift command to second speed is issued. By such an upside preliminary speed change, the two guide shafts move to the positions "C 1-2" and "M 1-2" shown on the left and right sides of the drawing.

The change in the guide grooves accompanying such an upside preliminary speed change is only for switching the guide groove SC2 from the middle position to the right position. Consequently, the shift fork 82 moves to the right position, and the sixth speed driven gear C6 is enmeshed with the second speed driven gear C2 by the dog clutch. At the point in time when the upside preliminary speed change is completed, since the second clutch CL2 is in a disengaged state, the outer main shaft 6 is rotated accordingly by the viscosity of the lubricating oil that is filled between the outer main shaft 6 and the inner main shaft 7.

Due to the above-described upside preliminary speed change, preparations are put in order for transmitting the rotational driving force via the second speed gear. In this state, when a shift command to second speed is issued, the first clutch CL1 is disconnected and the second clutch CL2 is switched to the connected state. In accordance with such a clutch switching operation, the rotational driving force is not interrupted, and the speed change operation to the second speed gear is completed immediately.

Subsequently, when the shift command to third speed is input after completion of the shifting operation from first speed to second speed, an upside preliminary speed change is executed in order that the speed change operation from second speed to third speed can be completed merely by switching the clutch. By the upside preliminary speed change from second speed to third speed, the guide shaft on the side of the countershaft moves from the position "C 1-2" to the position "C 3-2" shown on the left side of the drawing, and together therewith, the guide shaft on the side of the main shaft moves from the position "M 1-2" to the position "M 3-2" shown on the right side of the drawing. The change in the guide grooves accompanying this action is only for switching the guide groove SC1 from the left position to the right position. Consequently, the shift fork 81 moves from the left position to the right position, and the fifth speed driven gear C5 and the third speed driven gear C3 are enmeshed by the dog clutch.

When the upside preliminary speed change from second speed to third speed is completed, an operation is performed to switch the connection state of the twin clutch TCL from the second clutch CL2 to the first clutch CL1. More specifically, a state is brought about in which the speed change operation from second speed to third speed is completed merely by performing the clutch switching operation. The upside preliminary speed change is executed in the same manner until selection of the fifth speed gear.

At the time of the upside preliminary speed change from second speed to third speed, the guide groove SC1 passes through the middle position at the indication "C N-2" shown on the left side of the drawing, or stated otherwise, the position where enmeshing by the dog clutch is not performed. The rotational position of the shift drum 30 is detected by the gear position sensor 134, and the rotational velocity of the shift drum 30 can be finely adjusted by the shift motor 21. Consequently, for example, the rotational speeds from the indications "C 1-2" to "C N-2" shown on the left side of the drawing, and the rotational speeds from "C N-2" to "C 3-2" can be made different. Further, it is possible to perform a "neutral wait" operation to stop for a predetermined time period at the position of "C N-2". Moreover, the rotational velocities from the aforementioned indications "C 1-2" to "C N-2" are velocities when the state of engagement of the dog clutch between the driven gears C1, C5 is released. The rotational velocities from "C N-2" to "C 3-2" are velocities when the dog clutch is enmeshed between the driven gears C5, C3. In accordance with the configuration of the AMT 1 as described above, for example, during traveling with the second speed gear, the rotational position of the shift drum 30 can be arbitrarily changed between "1-2", "N-2", and "3-2".

When the neutral wait control is executed at a predetermined timing to temporarily stop at the "neutral wait" position, it becomes possible to reduce shifting or speed change shocks which are likely to occur at times of engagement and disengagement of the dog clutch. The drive timing and the driving speed of the shift drum 30 can be appropriately adjusted also in accordance with the engine rotational speed, the number of shift stages and the like when changing speeds.

When the shift drum 30 is in the "neutral wait" position, one of the transmission gear pairs on the odd-numbered stage side or the even-numbered stage side is in the neutral state. For example, at the position of "C N-2", the dog clutch is enmeshed between the driven gears C2 and C6, whereas the driven gear C5 is in a neutral state in which it is not enmeshed with either of the driven gears C1, C3. Accordingly, even if the first clutch CL1 is switched over to the connected state, only the inner main shaft 7 is rotated, and there is no influence on transmission of the rotational driving force to the countershaft 9.

FIG. 7 is a listing of the shift positions defined by the shift drum 30. The shift drum 30 changes the shift position by one stage at a time, for example, from N-N to 1-N by one shifting operation. On both the odd-numbered stage side and the even-numbered stage side, neutral wait positions as indicated by "N" are included between each of the respective gear positions. For example, at the position "1-N", while the odd-numbered stage side gears are in a state in which the gear for the first speed can be connected, the even-numbered stage side gears are in the neutral state in which the driving force is not transmitted even if the clutch is connected. In contrast thereto, at positions at which the neutral wait state is not provided, such as at the position "1-2", either one of the first clutch CL1 or the second clutch CL2 is connected in order to carry out transmission of the driving force.

Figure 8:
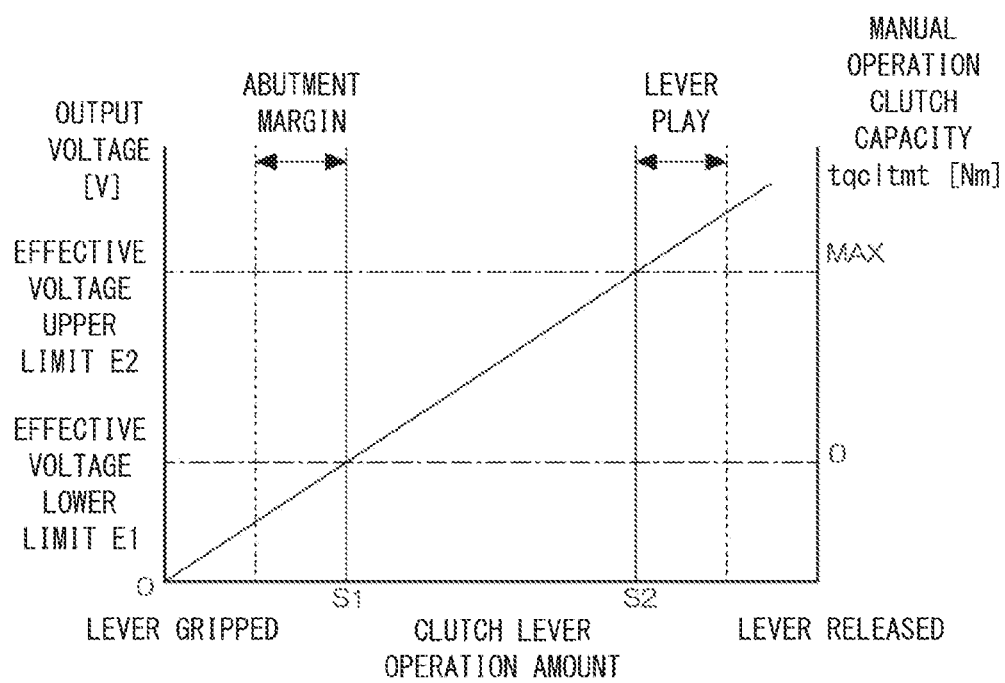
FIG. 8 is a graph showing a relationship between an operation amount of a clutch lever and an output signal of a clutch operation amount sensor.

FIG. 8 is a graph showing a relationship between an operation amount of the clutch lever L and an output signal of the clutch operation amount sensor SEL. The clutch lever L (see FIG. 1) drives the clutch, from a clutch connected state in which the clutch lever L is released, to a disconnection side in response to an amount of operation by the vehicle occupant. The clutch lever L returns to its initial position when the hand of the vehicle occupant is released. As an operation of the clutch lever L, for example, the clutch lever L may be gripped.

The clutch lever operation amount sensor SEL is set in a manner so that the output voltage (vcltlevin) thereof increases in response to release of the clutch lever L wherein a state in which the clutch lever L is gripped fully is represented as zero. Release of the clutch lever L refers to an operation of gradually releasing gripping of the clutch lever L. In the present embodiment, among the output voltages, a range, from which there are excluded an amount of play in the lever existing at the beginning of gripping, and an abutment margin considering that the grasped lever comes into contact with a handle grip formed of rubber or the like, is set to a range of effective voltages.

In greater detail, an interval from an operation amount S1, which is released until the abutment margin is ended from the gripped state of the clutch lever L, to an operation amount S2 at which the play in the lever begins is defined as a range of effective voltages from a lower limit value E1 to an upper limit value E2. The range from the lower limit value E1 to the upper limit value E2 is made to correspond in a proportional relationship with a range from the minimum value (zero) to the maximum value (MAX) of a manually operated clutch capacity computation value (tqcltmt). Consequently, it is possible to reduce the influence of mechanical backlash, sensor detection variations, and the like, as well as to enhance the reliability of the clutch driving amount required by manual operation.

Figure 9:
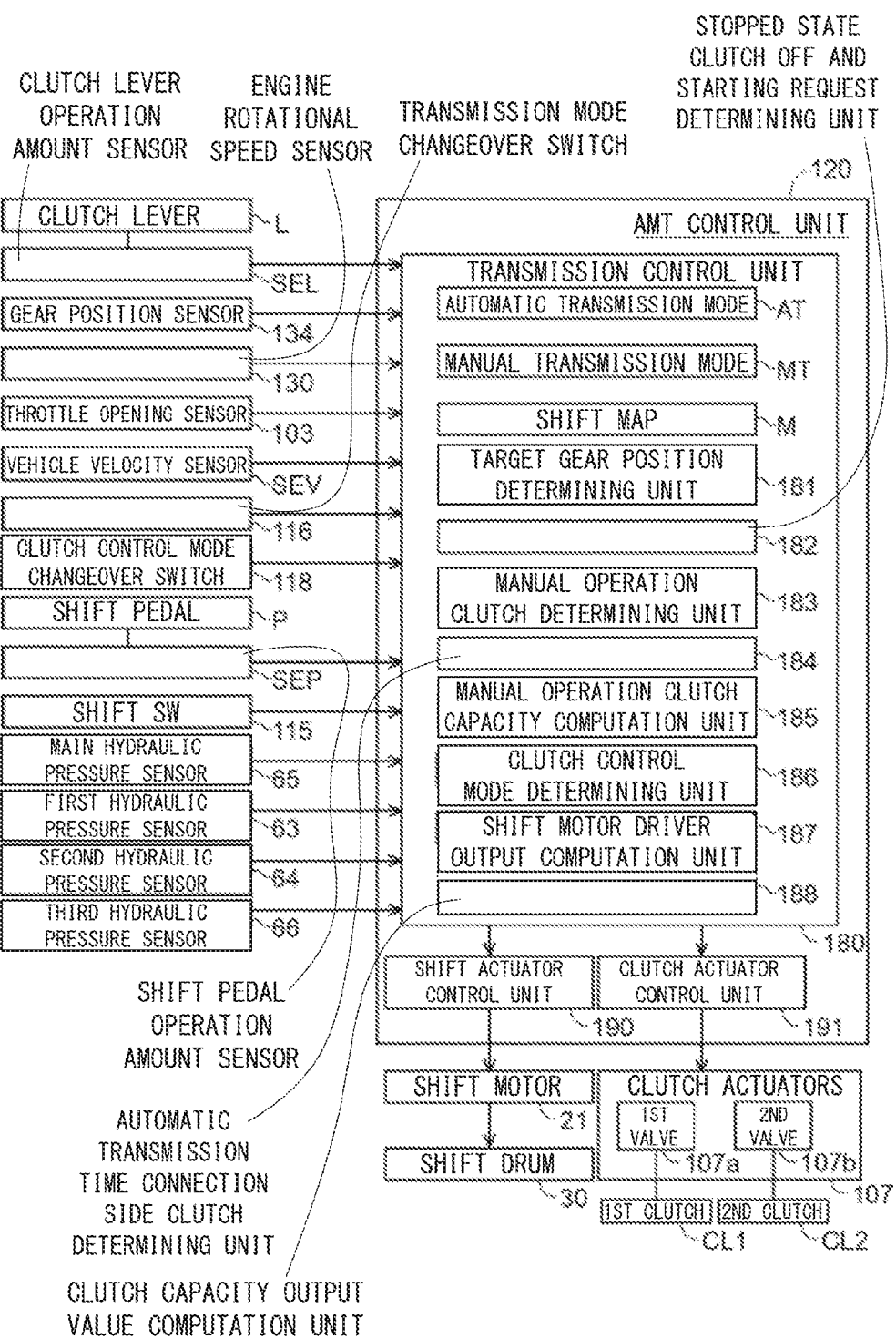
FIG. 9 is a block diagram showing the configuration of an AMT control unit.

FIG. 9 is a block diagram showing the configuration of the AMT control unit 120. In the drawing, identical reference numerals denote identical or equivalent parts. A transmission control unit 180 of the AMT control unit 120 includes an automatic transmission mode processing unit AT, a manual transmission mode processing unit MT, a shift map M, a target gear position determining unit 181, a stopped state clutch off and starting request determining unit 182, a manual operation clutch determining unit 183, an automatic transmission time connection side clutch determining unit 184, a manual operation clutch capacity computation unit 185, a clutch control mode determining unit 186, a shift motor drive output computation unit 187, and a clutch capacity output value computation unit 188.

Further, output signals from the clutch lever operation amount sensor SEL for detecting the operation amount of the clutch lever L, the gear position sensor 134, the engine rotational speed sensor 130, the throttle opening sensor 103, the vehicle velocity sensor SEV, the transmission mode changeover SW (switch) 116, the clutch control mode changeover SW (switch) 118, the shift pedal operation amount sensor SEP for detecting the operation amount of the shift pedal P, the shift SW (switch) 115, the main hydraulic pressure sensor 65, the first hydraulic pressure sensor 63, the second hydraulic pressure sensor 64, and the third hydraulic pressure sensor 66 are input to the transmission control unit 180.

When both the clutch control mode and the transmission mode are set to the automatic control, the transmission control unit 180 transmits a drive signal to a shift actuator control unit 190 and a clutch actuator control unit 191, in accordance with the shift map M which is made up from a three-dimensional map or the like, and on the basis of output signals principally from the engine rotational speed sensor 130, the throttle opening sensor 103, the gear position sensor 134, and the vehicle speed sensor SEV.

On the other hand, the AMT control unit 120 according to the present embodiment is configured in a manner so that manual operations for driving the twin clutch TCL and the shift drum 30 are capable of being executed in response to an operation of the clutch lever L, an operation of the shift switch 115, or an operation of the shift pedal P as manual operating devices. Among such manual operations, operations of the manual operating devices can be given priority not only in the case that the manual mode is selected by the transmission mode changeover switch 116 and the clutch control mode changeover switch 118, but also in the case that the manual operating devices are operated during the automatic control. Moreover, the AMT control unit 120 also carries out controls for the throttle valve motor 104 and the fuel injection devices and, for example, executes an automatic blipping (engine racing) control in order to adjust the engine rotational speed Ne when downshifting, and the like.

In the manual clutch operating mode of the AMT control unit 120 according to the present embodiment, a comfort mode and a direct mode are capable of being selected. Switching to the direct mode is performed by operating the direct switching button 119 shown in FIG. 3. Further, by pressing the direct switching button 119 for a prolonged period, a driving skill determination, which will be described later, is initiated. When the driving skill determination is initiated, the content displayed on the display unit 218 (see FIG. 11, etc.) is changed.

In the comfort mode, among the controls performed by the automatic clutch control mode in the manual transmission mode, an auxiliary automatic control is carried out for reducing shifting shocks or the like. More specifically, as shown in FIG. 10A, in the comfort mode, as shown by the one-dot dashed line La, upon operating the manual clutch, even if the clutch lever L is released early, then as indicated by the solid line Lb, the hydraulic pressure of the clutch is gradually increased in accordance with a rise in the engine rotational speed Ne to thereby engage the clutch, and to assist the clutch operation so that the vehicle 10 starts smoothly.

On the other hand, in the direct mode, execution of the auxiliary automatic control is suppressed, so as to place priority on operations of the clutch lever L by the driver, and to allow shifting shocks to occur to a certain degree. For example, as indicated by the solid line Lc in FIG. 10B, the hydraulic pressure is raised in accordance with operation of the clutch lever L, and the clutch is engaged. For example, if engagement of the clutch occurs too early upon starting, stopping of the engine 100, or starting in a non-smooth manner takes place, however, the occurrence thereof is permitted.

Figure 10A:
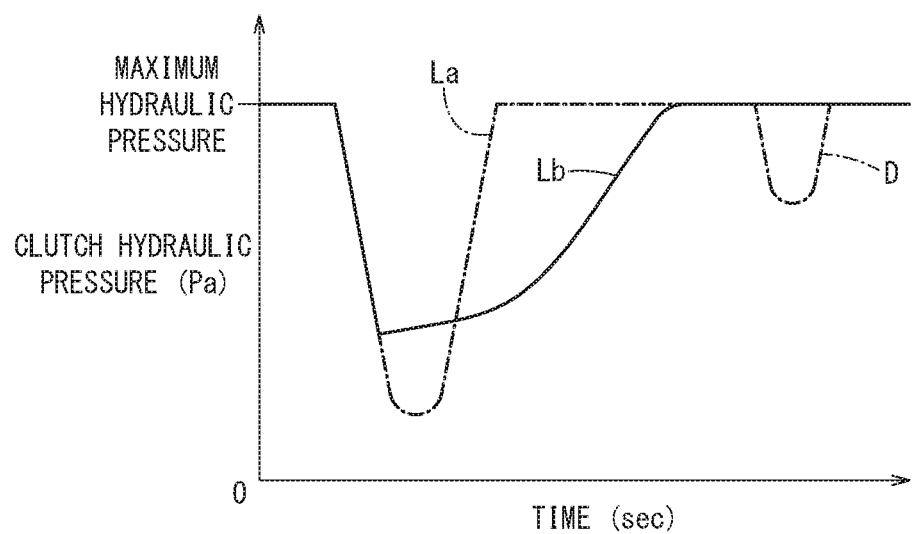
FIG. 10A is a graph showing an example of a hydraulic pressure control of the clutch in a comfort mode.
Figure 10B:
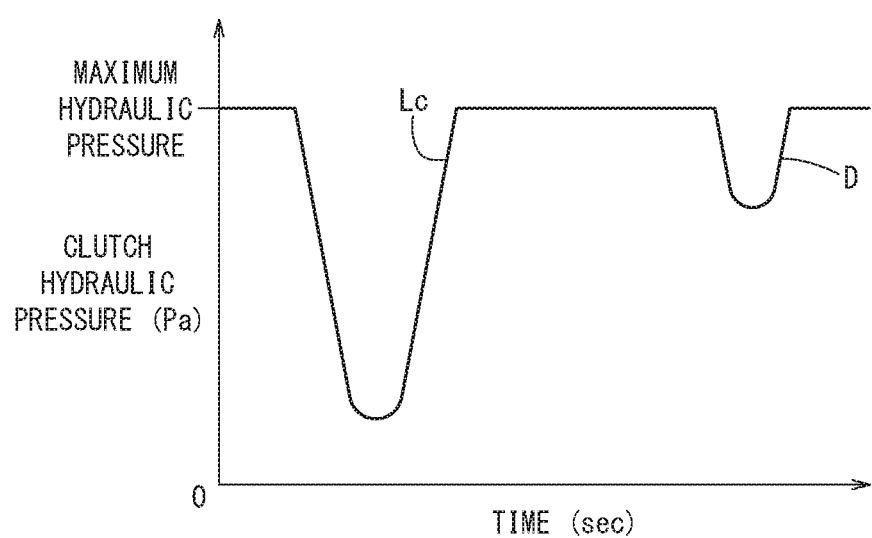
FIG. 10B is a graph showing an example of a hydraulic pressure control of the clutch in a direct mode.

An indentation D on the right side of the hydraulic pressure diagrams shown in FIGS. 10A and 10B occurs when the driver grips the clutch lever L slightly without making a speed change during steady traveling. In this case, the hydraulic pressure of the clutch is not reduced in the comfort mode (see FIG. 10A), however, in the direct mode, the hydraulic pressure of the clutch is changed in accordance with the operation of the driver (see FIG. 10B). Further, the automatic blipping control when downshifting, which is executed in the comfort mode, is not executed in the direct mode.

Moreover, even in the direct mode, transitioning to a safety mode may be implemented prior to a limiting event, such as when the engine is likely to experience stalling, the clutch is disengaged immediately before such stalling occurs, and rotation of the engine 100 is restored, together with displaying a warning or the like. As events for which entry into the safety mode takes place, in addition to engine stalling, a case in which half-clutching continues for a prolonged period may also be cited.

In addition, in the direct mode, furthermore, using a driving skill determining device 200 (see FIG. 11) in accordance with a selection of the driver, a determination of the skill of the driver can be performed on the basis of operations of the clutch lever and operations of the throttle. Although not shown, the driving skill determining device 200 is incorporated in the AMT control unit 120, for example.

Figure 11:
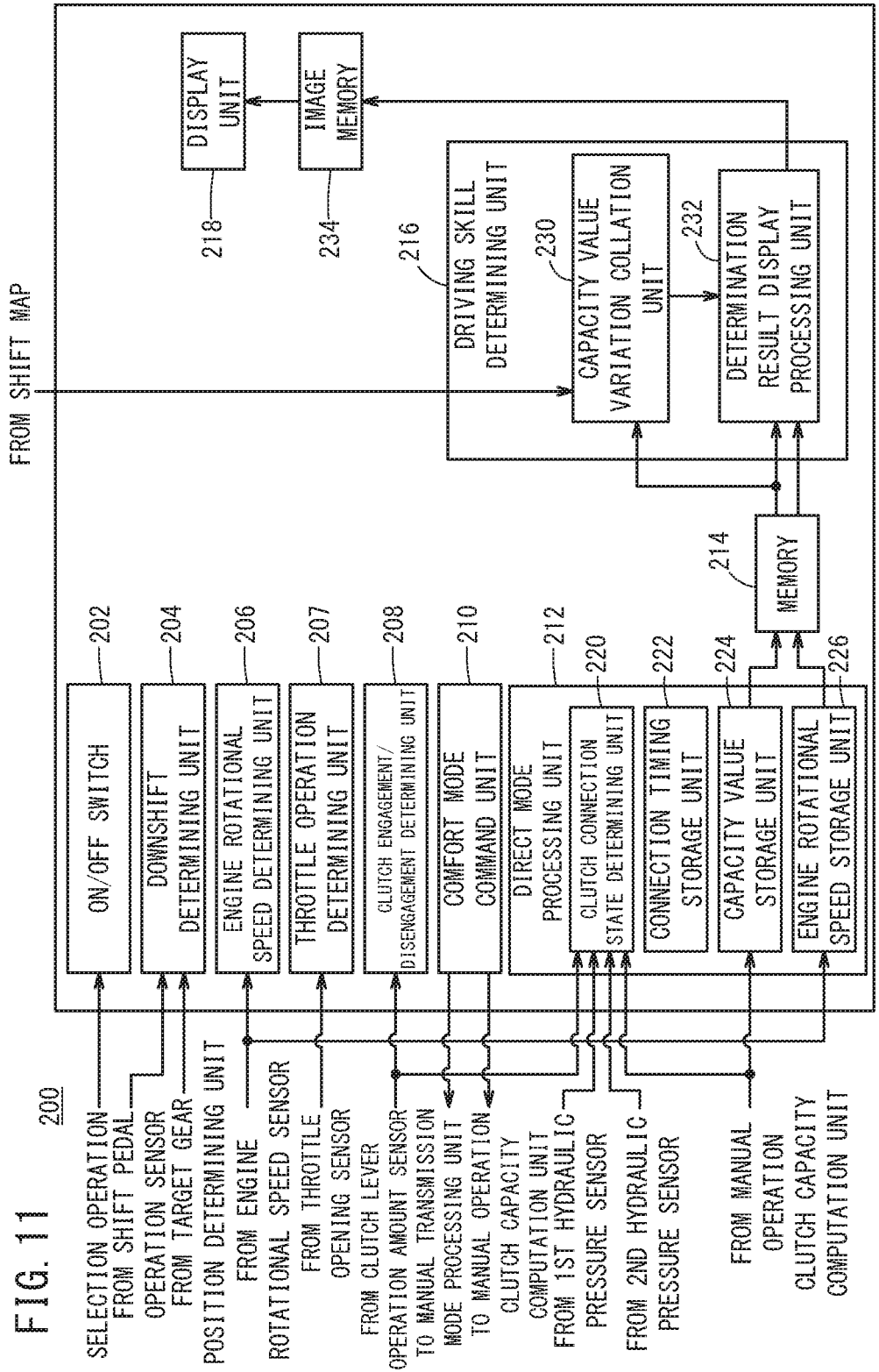
FIG. 11 is a block diagram showing the configuration of a driving skill determining device.

Next, the driving skill determining device 200 will be described with reference to FIGS. 11 to 21. In FIG. 11, concerning the AMT control unit 120, only the main functional units thereof are shown.

As shown in FIG. 11, the driving skill determining device 200 includes an ON/OFF switch 202 for starting and stopping the driving skill determining device 200, a downshift determining unit 204, an engine rotational speed determining unit 206, the aforementioned clutch lever operation amount sensor SEL and the throttle opening sensor 103 (see FIG. 9), the engine rotational speed sensor 130 (see FIG. 9), a throttle operation determining unit 207, a clutch engagement/disengagement determining unit 208, a comfort mode command unit 210, a direct mode processing unit 212, a memory 214, a driving skill determining unit 216, and the display unit 218.

The downshift determining unit 204 determines whether downshifting has taken place, on the basis of the target gear position from the target gear position determining unit 181 (see FIG. 9), or alternatively, on the basis of an output of the shift pedal operation amount sensor SEP. The engine rotational speed determining unit 206 determines an increase in the engine rotational speed, on the basis of the engine rotational speed from the engine rotational speed sensor 130 (see FIG. 9). The clutch engagement/disengagement determining unit 208 determines the point in time at which the clutch is disengaged on the basis of an output signal from the clutch lever operation amount sensor SEL (see FIG. 9). The throttle operation determining unit 207 determines a throttle operation such as a blipping operation or the like on the basis of an output of the throttle opening sensor 103.

The comfort mode command unit 210 outputs command signals with respect to the manual transmission mode processing unit MT and the manual operation clutch capacity computation unit 185 (see FIG. 9) in order to implement a comfort mode process. The manual transmission mode processing unit MT carries out the comfort mode process on the basis of an input command signal from the comfort mode command unit 210. More specifically, based on a rise in the engine rotational speed Ne, a capacity value data string for a preset comfort mode is read out in chronological order from the shift map M (see FIG. 9), and based on the clutch lever L operation amount, the target capacity is calculated by a comfort mode computation process in the manual operation clutch capacity computation unit 185, and the target capacity is output to the clutch actuator control unit 191 (see FIG. 9).

The direct mode processing unit 212 includes a clutch connection state determining unit 220, a connection timing storage unit 222, a capacity value storage unit 224, and an engine rotational speed storage unit 226.

Based on the output from the clutch lever operation amount sensor SEL (see FIG. 9) or the capacity value from the manual operation clutch capacity computation unit 185 (see FIG. 9), or alternatively, based on output signals from the first hydraulic pressure sensor 63 and the second hydraulic pressure sensor 64, the clutch connection state determining unit 220 determines whether connection of the clutch is completed or is in a clutch connection state such as half-clutching or the like.

On the basis of the point in time when the engine rotational speed Ne increases, the connection timing storage unit 222 stores the starting time of engagement (a starting point of increase in the capacity value) of the clutch, and the completion time of engagement of the clutch (a time point of arrival at the maximum value of the capacity value).

The capacity value storage unit 224 stores in chronological order in the memory 214 the change in the capacity value from the starting time of engagement of the clutch to the completion time of engagement of the clutch.

The engine rotational speed storage unit 226 stores in chronological order in the memory 214 the change in the engine rotational speed Ne from the starting time of engagement of the clutch to the completion time of engagement of the clutch.

The driving skill determining unit 216 includes a capacity value variation collation unit 230, and a determination result display processing unit 232.

The capacity value variation collation unit 230 collates the time-series data of the capacity values corresponding to the comfort mode recorded in the shift map M (see FIG. 9), and the time-series data of the capacity values stored in the memory 214 (time-series data of the capacity values in accordance with manual operations by the driver) and outputs a rate of agreement therebetween.

The determination result display processing unit 232 performs at least a fixed data rendering process, a capacity value variation rendering process, a rotational speed variation rendering process, a ranking rendering process, and a process of displaying images rendered in an image memory 234 on the display unit 218.

Figure 12A:
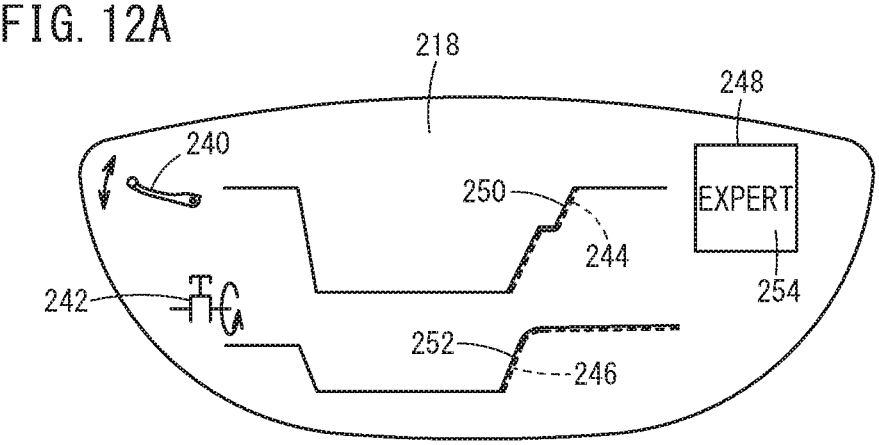
FIG. 12A is an explanatory diagram showing a display example of an "EXPERT" ranking.
Figure 12B:
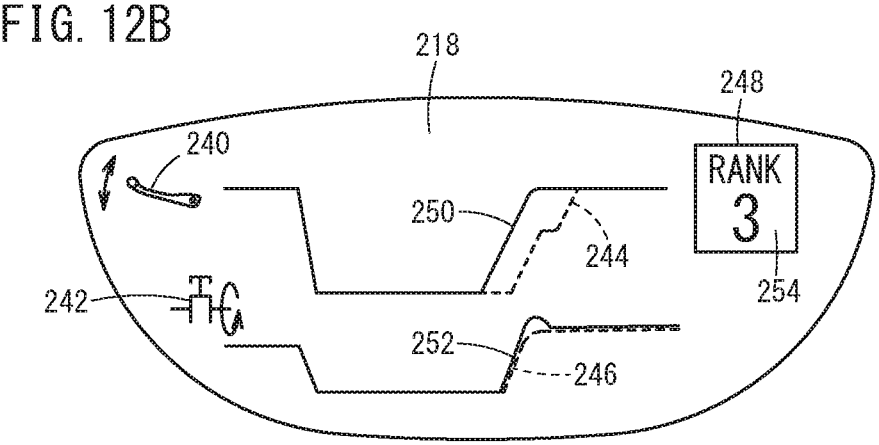
FIG. 12B is an explanatory diagram showing a display example of a level "3" ranking.
Figure 12C:
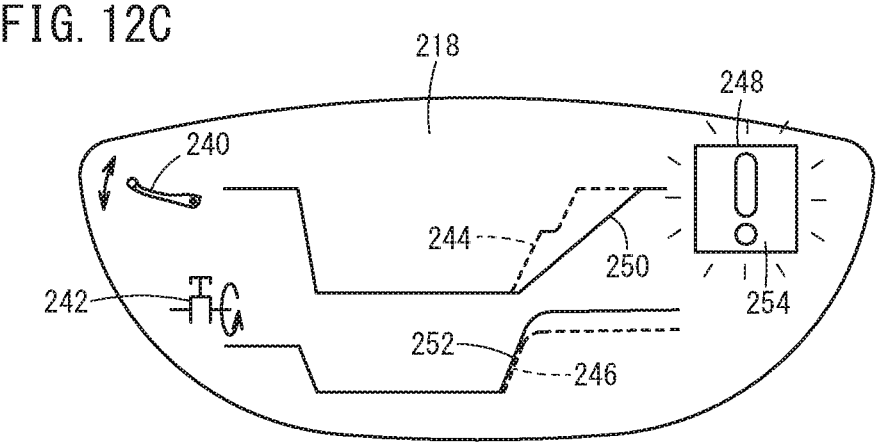
FIG. 12C is an explanatory diagram showing a display example of a level "1" ranking.

As shown in FIGS. 12A to 12C, for example, the fixed data rendering process renders fixed data (a FIG. 240 showing the clutch lever, a FIG. 242 showing rotation of the engine 100, a line diagram 244 showing variations in an ideal capacity value before and after disengagement of the clutch, a line diagram 246 showing variations in an ideal engine rotational speed Ne before and after disengagement of the clutch, and a ranking display frame 248) in the image memory 234.

In the capacity value variation rendering process, time-series data of the capacity values stored in the memory 214 are rendered in the form of a line diagram 250 in the image memory 234.

In the rotational speed variation rendering process, time-series data of the engine rotational speeds Ne stored in the memory 214 are rendered in the form of a line diagram 252 in the image memory 234.

In the ranking rendering process, characters or icons, or alternatively, numbers 254 corresponding to the rankings stored in the memory 214 are rendered in the image memory 234.

In addition, the determination result display processing unit 232 displays on the display unit 218 the line diagrams, the characters, and the like that are rendered in the image memory 234. When such a display is made, animations may also be displayed, so that the line diagrams showing the capacity values and the engine rotational speeds Ne flow from the left to the right while leaving a trajectory therebehind. Of course, the line diagrams showing the capacity values and the engine rotational speeds Ne may also be displayed in different colors, respectively. In this case, an ideal line of variation in the capacity values may be displayed in a color that differs from the color of the other line diagram of the variation in the capacity values.

In this case, the determination result of the ranking is indicated by a hierarchy of five levels or the like, for example. In the case of the highest ranking "5", as shown in FIG. 12A, instead of displaying a number indicating the ranking, for example, the word "EXPERT" may be displayed, to convey a representation of prestige or respect to the driver. In this case, the entire display may be made to emit light in a bluish color. In the case of the rankings "1" to "4", as shown in FIG. 12B, a number indicating the ranking may be displayed under the word "RANK". Further, in the case that an error message or a message for the purpose of providing coaching or the like to the driver is displayed, as shown in FIG. 12C, for example, the icon "!" may be displayed in a blinking manner in a reddish color or the like, to convey the meaning of issuing an alert or warning with respect to the driver.

Figure 13:
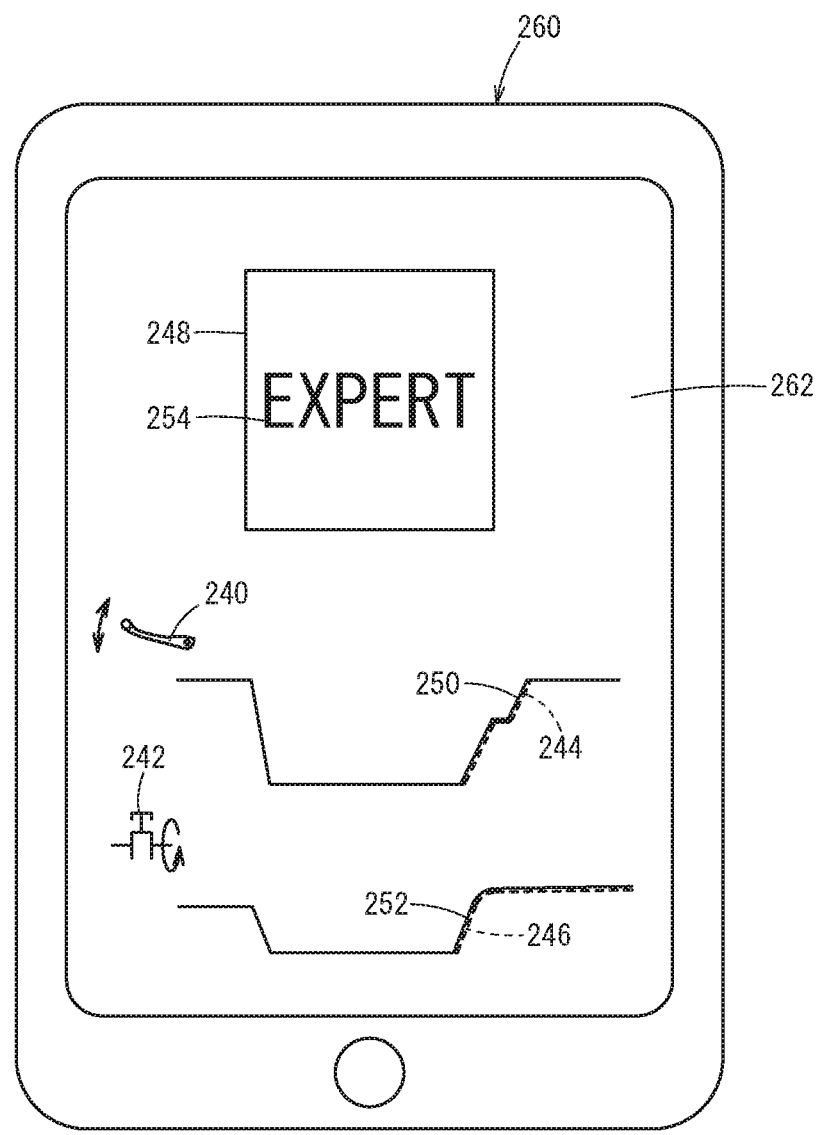
FIG. 13 is an explanatory diagram showing an example in which a determination result is displayed on a display unit of a portable information terminal.

Further, as shown in FIG. 13, the image data rendered in the image memory 234 may be transmitted to a mobile information terminal 260 of the driver, and may be displayed on a display unit 262 of the mobile information terminal 260.

Next, process operations of the driving skill determining device 200 will be described with reference to the time charts of FIGS. 14 to 18.

As an example, a case will be assumed of downshifting from second speed to first speed while traveling in the manual mode.

Figure 14:
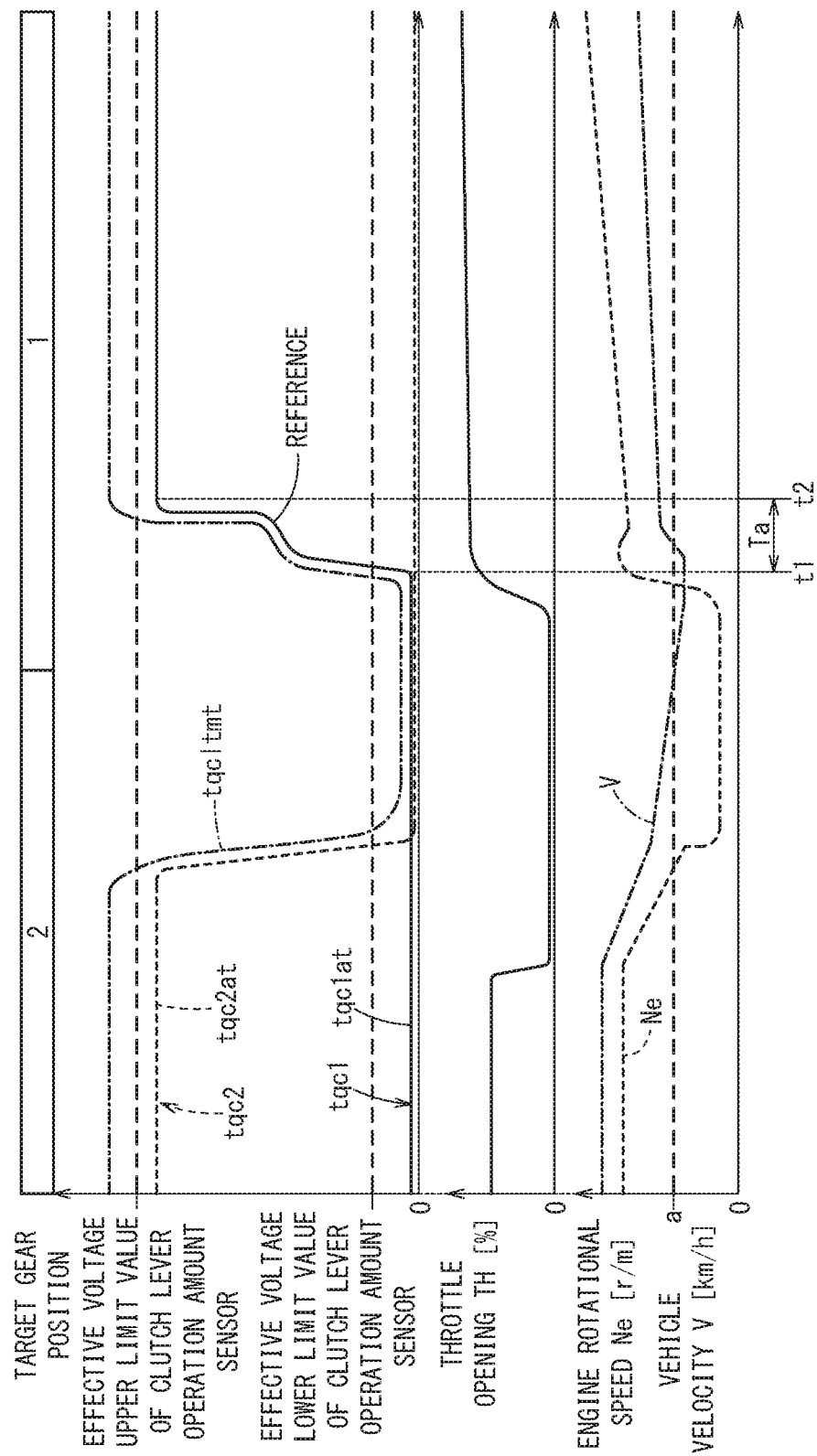
FIG. 14 is a time chart showing an example of an operation timing of the clutch lever, which serves as a reference when downshifting from second speed to first speed.

The time chart of FIG. 14 shows operation timings of the clutch lever L, which serve as a reference when downshifting from second speed to first speed.

The operation timings illustrate an example in which the clutch lever L is returned after having shifted from first speed to second speed, at time t2 when a predetermined time period Ta has elapsed from time t1 when the rotational speed Ne of the engine 100 has started to rise. Transitions of such timings serve as a criterion for the skill determination when in the direct mode, and a driver who operates the clutch lever L closely to such timings is determined to be a driver with high skill.

Figure 15:
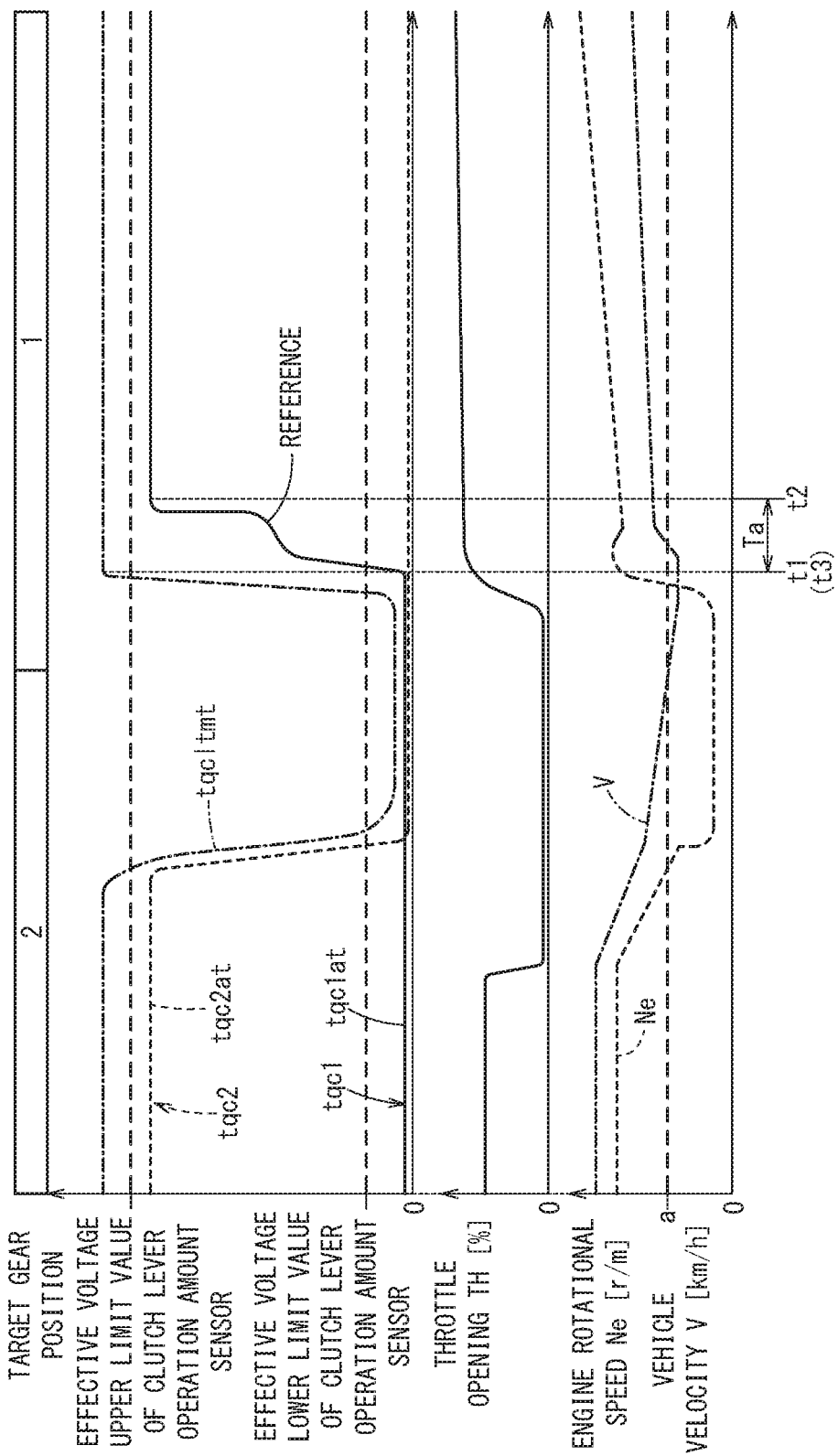
FIG. 15 is a time chart showing an example of an operation timing of the clutch lever in the case of the comfort mode.

The time chart of FIG. 15 shows operation timings of the clutch lever L in the case of the comfort mode. In the comfort mode, while waiting for a rise in the engine rotational speed Ne, the clutch is connected while half-clutching is used with good efficiency.

The operation timings shown in FIG. 15 illustrate an example in which, at a time of downshifting, the clutch lever L is returned in a state in which the rise in the engine rotational speed Ne (blipping) prior to connection of the clutch is insufficient.

In the comfort mode, even in the case that the clutch lever L is returned at time t3 when the predetermined time period Ta has not yet elapsed from time t1 at which the engine rotational speed Ne started to rise, similar to the reference example shown in FIG. 14, at a predetermined time point t2, the clutch lever L is returned after having shifted from second speed to first speed.

Figure 16:
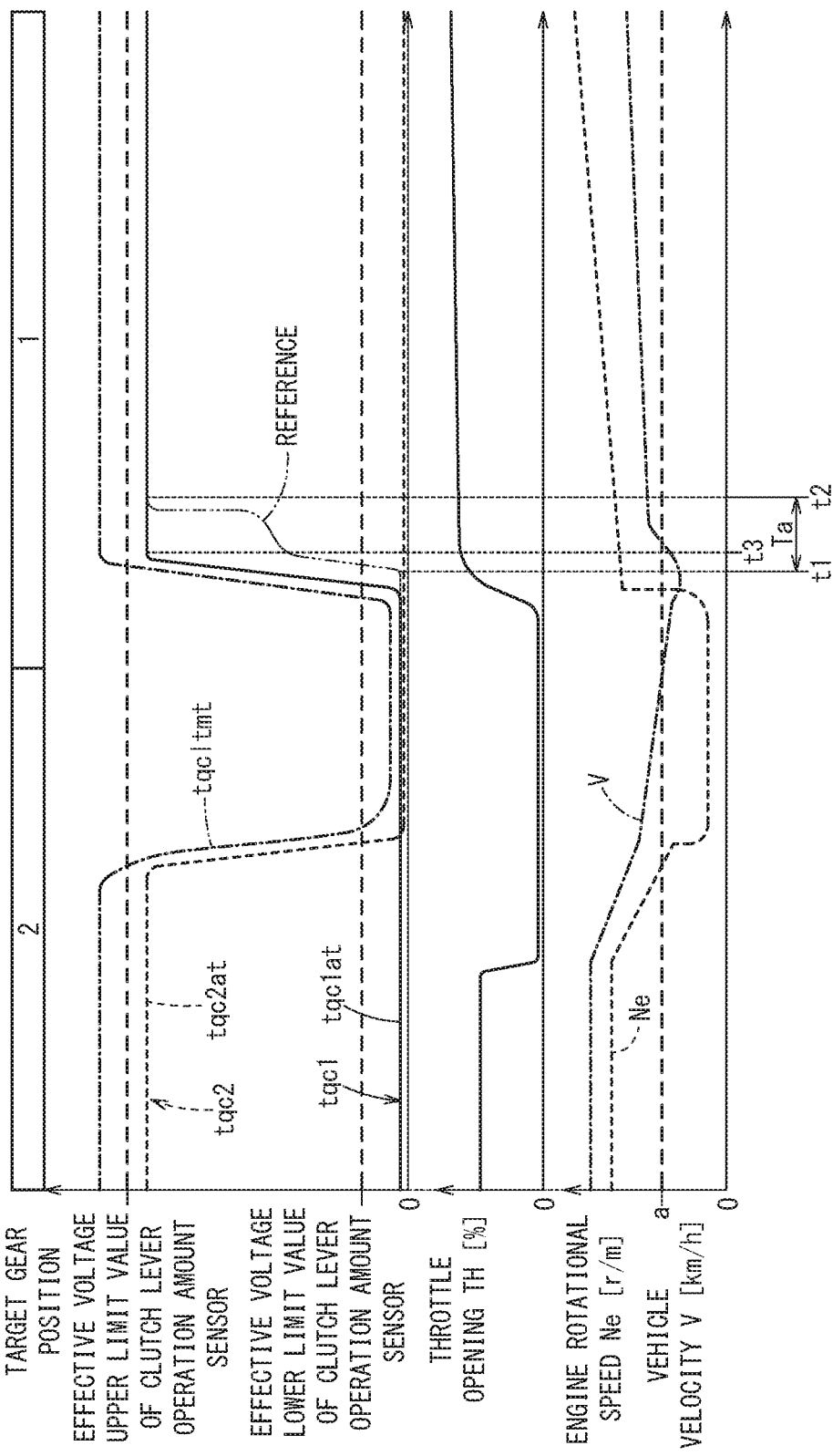
FIG. 16 is a time chart showing a case in which the clutch lever is returned in a state in which the engine rotational speed is not sufficiently increased.
Figure 17:
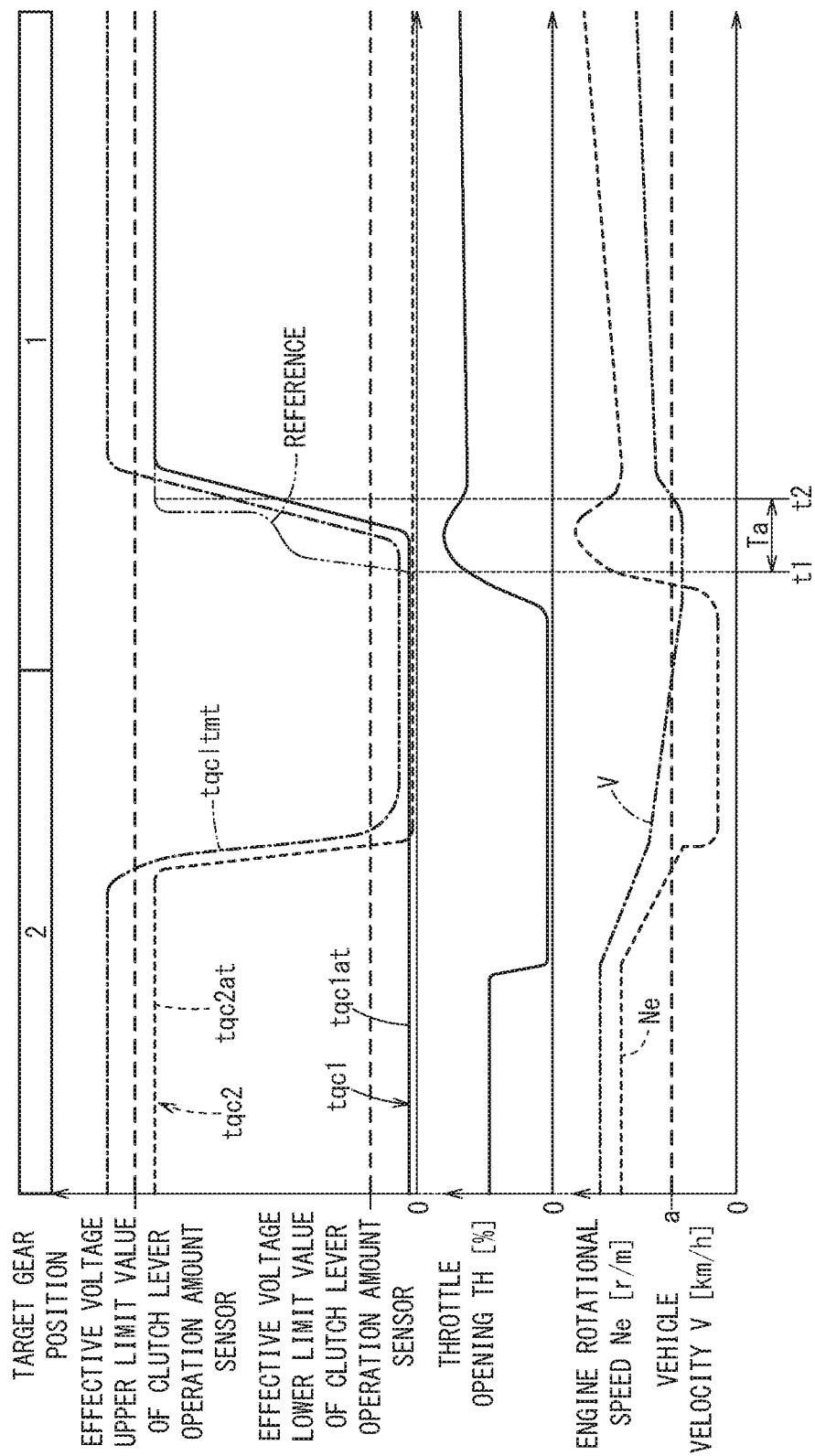
FIG. 17 is a time chart showing a case in which the throttle opening at a time when throttle blipping is performed by the driver is excessive, and releasing of the clutch lever occurs later than a reference timing.
Figure 18:
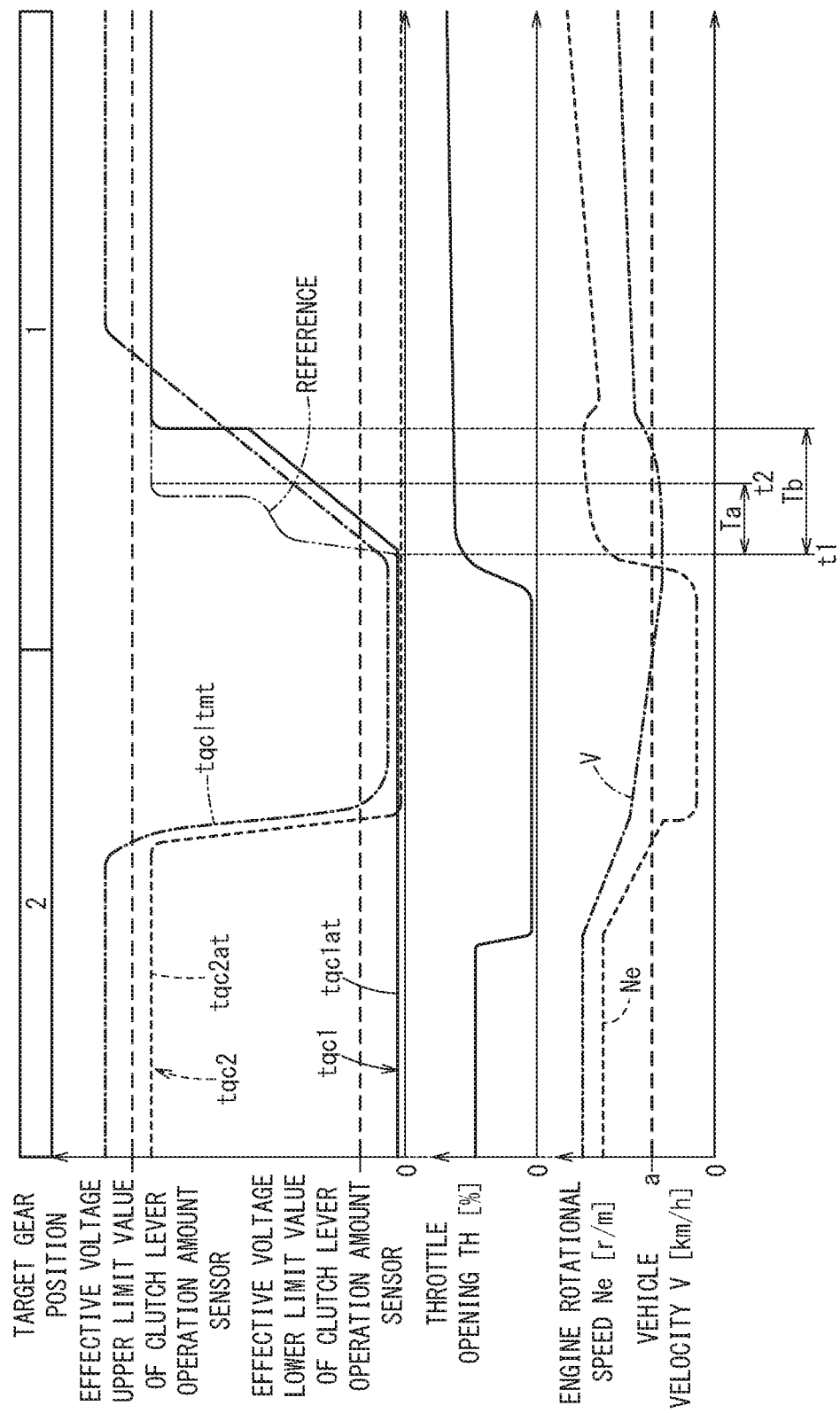
FIG. 18 is a time chart showing a case in which releasing of the clutch is very slow and half-clutching is continued.

The time charts of FIGS. 16 to 18, respectively, show operation timings of the clutch lever L in the case of the direct mode.

FIG. 16 shows a case in which the clutch lever L is returned, in a state in which the engine rotational speed Ne is not sufficiently increased, and more specifically, at a timing (time t3) which is earlier than the reference time point t2. In the direct mode, unlike the comfort mode, operations of the clutch lever L by the driver are reflected directly and without modification. Therefore, even if the engine rotational speed Ne is not sufficiently increased, the clutch is connected. In this case, since the clutch is engaged in a state in which the rise in the engine rotational speed (blipping) in accordance with opening of the throttle is insufficient, by being rotated from the rear wheel WR, the engine rotational speed Ne rapidly rises, together with engine braking being applied. More specifically, the vehicle velocity V is momentarily lowered, and movement of the vehicle body is not smooth. By the behavior of the vehicle body, the driver realizes that the manner in which the clutch was engaged was not the best.

FIG. 17 shows a case in which the throttle opening at a time when throttle blipping is performed by the driver is excessive, and releasing (engagement) of the clutch lever L occurs later than at the reference timing. In the direct mode, as described above, operations of the clutch lever L by the driver are reflected directly and without modification. Therefore, although the engine rotational speed Ne increases, the clutch slips, and a state occurs in which the vehicle velocity V does not increase. More specifically, the vehicle speed V does not increase in contrast to the rise in the engine rotational speed Ne, and the driver senses a so-called unsteady or restless feeling of the engine 100, or sounds and vibrations due to half-clutching.

FIG. 18 shows a case in which releasing of the clutch is very slow and half-clutching is continued, more so than in the aforementioned example of FIG. 17. In this case, a situation is determined in which the clutch should be protected, and a control to protect the clutch is carried out. More specifically, when the half-clutching state continues more than a predetermined time period Tb, the clutch is engaged at an appropriate engine rotational speed Ne, for example, by a TBW (throttle-by-wire) technique. In this case, a warning notification is issued to the driver by way of the display unit 218 or the like.

Next, a description will be given with reference to the flowcharts of FIGS. 19 to 21 concerning process operations of the driving skill determining device 200, and the comfort mode and the direct mode which are capable of being selected in the manual clutch operating mode. At a time that the manual clutch operating mode is selected, when the direct switching button 119 (see FIG. 3) is pressed, switching takes place from the comfort mode to the direct mode. Further, by pressing the direct switching button 119 for a prolonged period, a driving skill determination is executed in the direct mode.

First, the comfort mode process, which is executed by the manual transmission mode processing unit MT, will be described with reference to FIG. 19.

Figure 19:
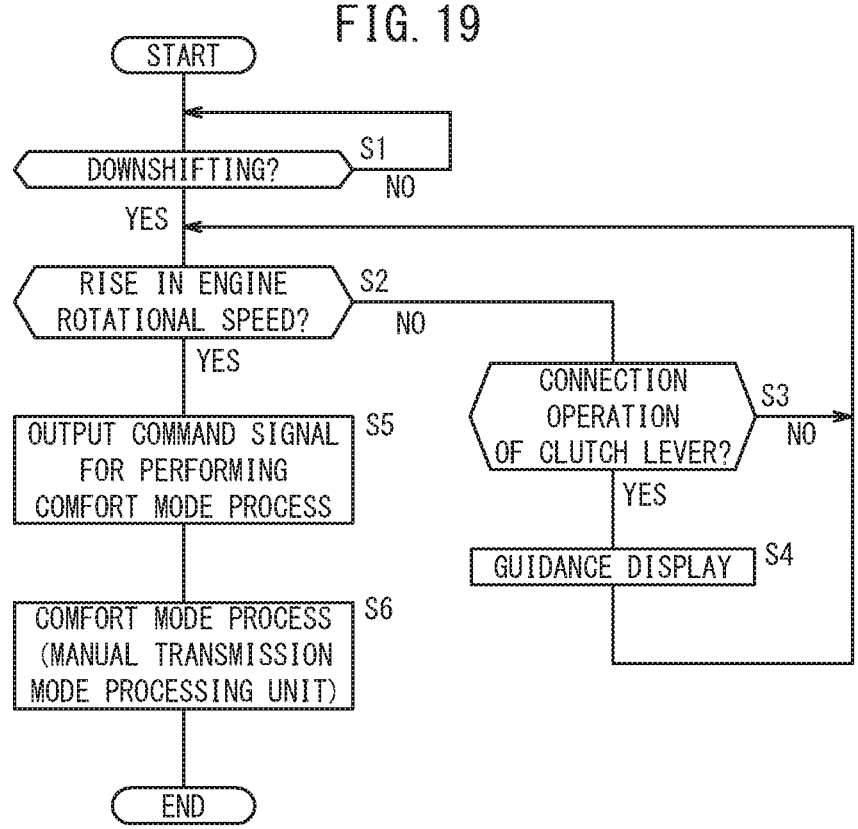
FIG. 19 is a flowchart showing an example of a comfort mode process.

The process flow in FIG. 19 is initiated by the clutch connection state determining unit 220 determining that the driver has manually disconnected the clutch with the clutch lever L or the like. Then, in step S1, the downshift determining unit 204 determines whether or not there is a speed change request to carry out downshifting. Such a determination, for example as shown in FIG. 14, is made on the basis of whether or not the target gear position has been switched from "2" to "1", for example.

In the case of a downshift speed change request, the process proceeds to the following step S2, and the engine rotational speed determining unit 206 determines whether or not the engine rotational speed Ne has started to rise accompanying an increase in the throttle opening by the driver. In the case that the engine rotational speed Ne does not start to rise, the process proceeds to step S3, whereupon a determination is made as to whether or not the driver has started a connection operation of the clutch lever L. In the case that the connection operation is started, the process proceeds to step S4, and guidance (a message) indicating that the throttle is being automatically operated using a TBW technique is displayed on the display unit 218 under a condition in which the clutch lever L is disengaged. Thereafter, the routine returns to step S2, and the processes of step S2 and the steps thereafter are repeated.

If it is determined in step S2 that the engine rotational speed Ne has started to rise (step S2: YES), the process proceeds to the following step S5, in which the comfort mode command unit 210 outputs a command signal for carrying out the comfort mode process with respect to the manual transmission mode processing unit MT (see FIG. 9).

In step S6, the manual transmission mode processing unit MT and the manual operation clutch capacity computation unit 185 carry out the comfort mode process on the basis of the input of the command signal from the comfort mode command unit 210. More specifically, based on a rise in the engine rotational speed Ne, a capacity value data string for a preset comfort mode is read out in chronological order from the shift map M (see FIG. 9), and based on the clutch lever L operation amount, the target capacity is calculated by the manual operation clutch capacity computation unit 185, and the target capacity is output to the clutch actuator control unit 191 (see FIG. 9). In addition, at a stage at which connection of the clutch is completed, the comfort mode process is brought to an end.

Next, the direct mode and the driving skill determination processes, which are executed by the manual transmission mode processing unit MT, will be described with reference to FIGS. 20 and 21.

Figure 20:
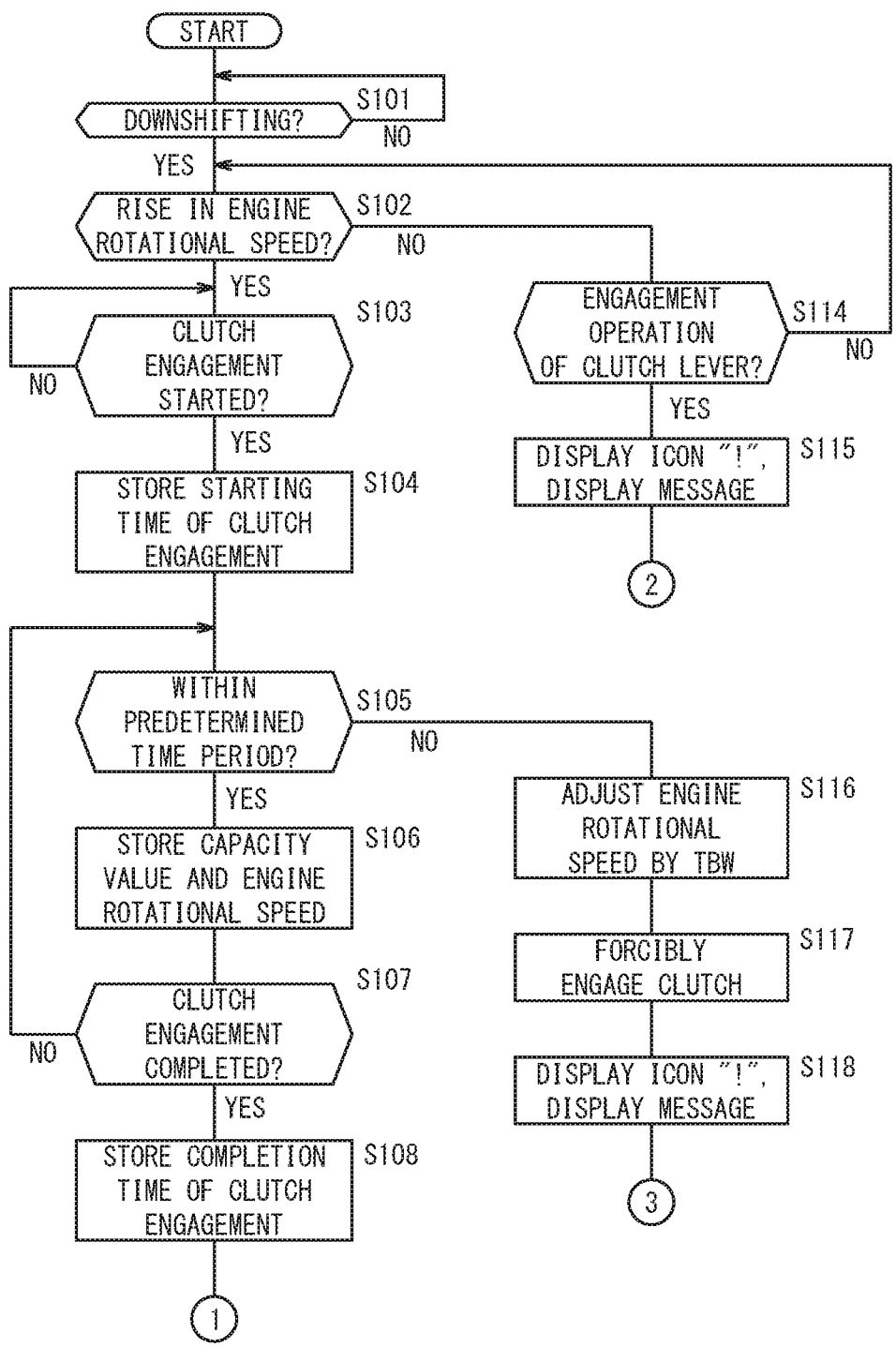
FIG. 20 is a flowchart showing process operations when a driving skill determination is executed in the direct mode.

The process flow in FIG. 20, similar to that of FIG. 19, is initiated by the clutch connection state determining unit 220 determining that the driver has disconnected the clutch. Then, in step S101, the downshift determining unit 204 determines whether or not there is a speed change request to carry out downshifting. Such a determination, for example as shown in FIG. 14, is made on the basis of whether or not the target gear position has been switched from "2" to "1", for example.

In the case of a downshift speed change request (step S101: YES), the process proceeds to the following step S102, and the engine rotational speed determining unit 206 determines whether or not the engine rotational speed Ne has started to rise accompanying an increase in the throttle opening by the driver. In the case that the engine rotational speed Ne has started to rise (step S102: YES), the process proceeds to step S103, whereupon the clutch connection state determining unit 220 waits for the release of the clutch lever L (engagement of the clutch) to start. When releasing of the clutch lever L has started (step S103: YES), the process proceeds to the following step S104, whereupon the connection timing storage unit 222 stores in the memory 214 the starting time of release of the clutch lever L.

Thereafter, in step S105, the clutch connection state determining unit 220 determines whether or not it is within a predetermined time period Tb (>>Ta) from the point in time at which releasing of the clutch lever L was started. If it is within the predetermined time period Tb (step S105: YES), the process proceeds to step S106, whereupon the capacity value storage unit 224 and the engine rotational speed storage unit 226 store in chronological order in the memory 214, respectively, the current capacity values and the engine rotational speeds Ne.

Next, in step S107, the clutch connection state determining unit 220 determines whether or not engagement of the clutch by the operation of the clutch lever L has been completed. This determination is made, for example, based on whether or not the capacity value has reached an upper limit value. If engagement of the clutch is not yet completed (step S107: NO), the process proceeds to step S105, and the processes of step S105 and the steps thereafter are repeated.

In addition, at a stage at which engagement of the clutch by operation of the clutch lever L is completed (step S107: YES), the process proceeds to the following step S108, whereupon the connection timing storage unit 222 stores in the memory 214 the point in time at which engagement of the clutch is completed.

Figure 21:
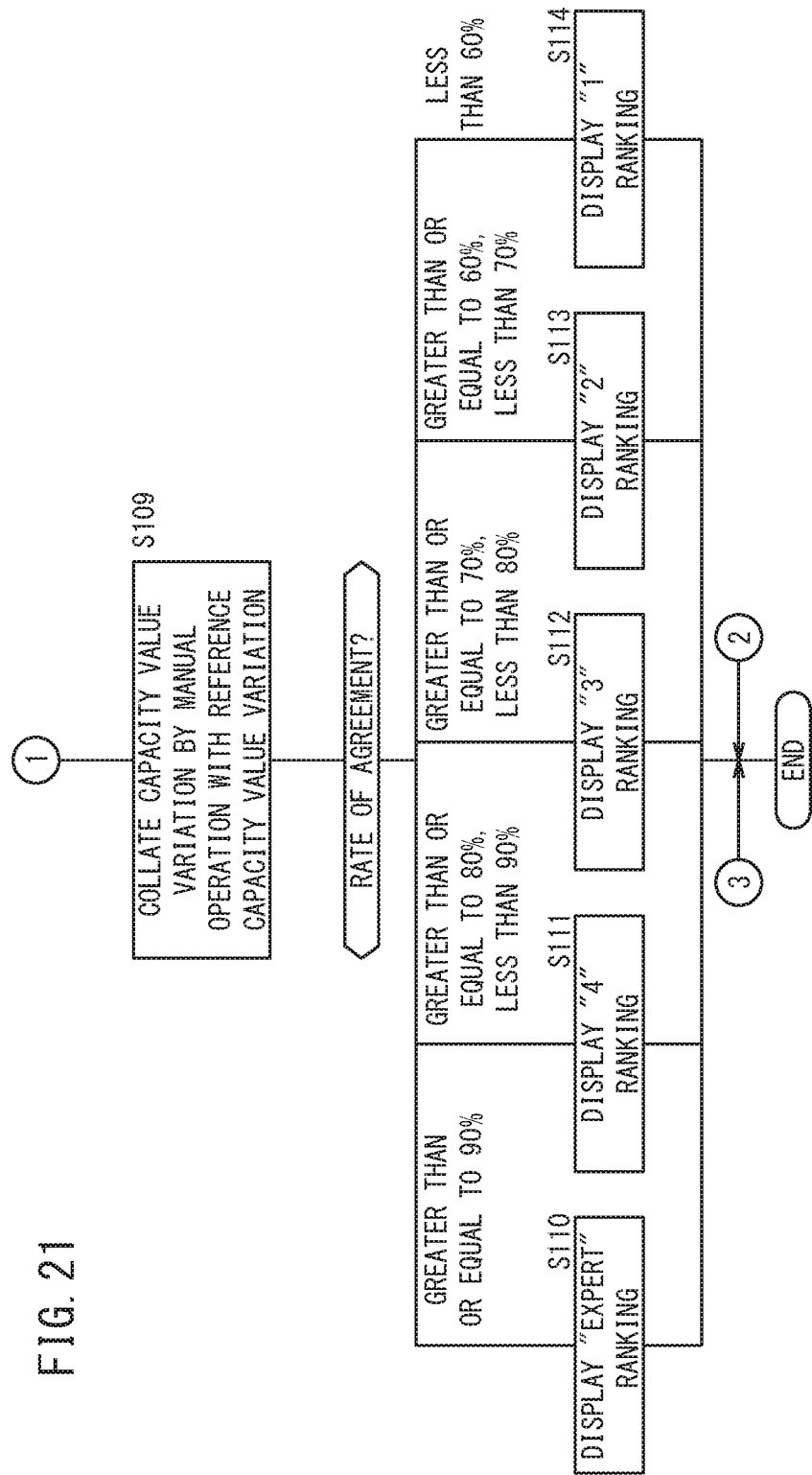
FIG. 21 is a flowchart showing a process for displaying the determination result in accordance with the driving skill determination.

Thereafter, in step S109 of FIG. 21, the capacity value variation collation unit 230 collates the time-series data of the variation in the capacity values stored in the memory 214 with the reference values stored in the shift map M, and the time-series data of the variation in the capacity values derived by the manual operation clutch capacity computation unit 185 assuming operation under the comfort mode.

As a result of the collation, if the rate of agreement, for example, is greater than or equal to 90%, the process proceeds to step S110, and the determination result display processing unit 232 displays the fixed data on the display unit 218, and for example, displays the word "EXPERT" corresponding to the ranking, and furthermore, displays the variation in the capacity values and the variation in the engine rotational speeds stored in time-series in the memory 214.

Similarly, if the rate of agreement, for example, is greater than or equal to 80% and less than 90%, the process proceeds to step S111, and the determination result display processing unit 232 displays the fixed data on the display unit 218, and for example, displays the number "4" corresponding to the ranking, and furthermore, displays the variation in the capacity values and the variation in the engine rotational speeds stored in time-series in the memory 214.

Similarly, if the rate of agreement, for example, is greater than or equal to 70% and less than 80%, the process proceeds to step S112, and the determination result display processing unit 232 displays the fixed data on the display unit 218, and for example, displays the number "3" corresponding to the ranking, and furthermore, displays the variation in the capacity values and the engine rotational speeds Ne stored in time-series in the memory 214.

Similarly, if the rate of agreement, for example, is greater than or equal to 60% and less than 70%, the process proceeds to step S113, and the determination result display processing unit 232 displays the fixed data on the display unit 218, and for example, displays the number "2" corresponding to the ranking, and furthermore, displays the variation in the capacity values and the engine rotational speeds stored in time-series in the memory 214.

Similarly, if the rate of agreement, for example, is less than 60%, the process proceeds to step S114, and the determination result display processing unit 232 displays the fixed data on the display unit 218, and for example, displays the number "1" corresponding to the ranking, and furthermore, displays the variation in the capacity values and the engine rotational speeds Ne stored in time-series in the memory 214.

On the other hand, if it is determined in the above-described step S102 of FIG. 20 that the engine speed Ne has not yet started increasing, the process proceeds to step S114, whereupon it is determined whether or not the capacity value is increasing. If the capacity value is increasing, the process proceeds to step S115, whereupon the fixed data is displayed on the display unit 218 together with displaying the icon "!", and furthermore, a message is displayed for coaching the blipping operation.

On the other hand, if it is determined in the above-described step S105 of FIG. 20 that the predetermined time period has elapsed, the process proceeds to step S116, and the engine rotational speed Ne is automatically adjusted by a TBW (throttle-by-wire) technique, and thereafter, in step S117, the clutch is forcibly engaged.

Furthermore, in step S118, fixed data is displayed on the display unit 218 together with displaying the icon "!" and, for example, a message indicating that forcible engagement of the clutch has taken place. In this case, a message for coaching the release timing of the clutch lever L may also be displayed. At this time, the variation in the capacity values and the engine rotational speeds Ne, which have been stored in chronological order in the memory 214, may also be displayed.

In the example described above, although the evaluation is carried out in five stages, the evaluation may be performed with a number of stages greater than or equal to five. In that case, the evaluation stage may be increased by comparing the point in time at which engagement of the clutch is started and the time point at which engagement of the clutch is completed, with respective reference values therefor which are stored in the memory 214.

In the foregoing manner, according to the present embodiment, the power transmission device 300 of the vehicle 10 is equipped with the control unit 120 adapted to automatically control engagement or disengagement of the clutch, and is further equipped with a clutch engagement/disengagement operating element (the clutch lever L) for manually engaging or disengaging the clutch. Further, the power transmission device 300 includes a manual mode in which the clutch is engaged or disengaged by a driver performing an engagement or disengagement operation with the clutch engagement/disengagement operating element (L) and an automatic mode in which the clutch is engaged or disengaged under the control of the control unit 120 without the driver performing the engagement or disengagement operation. The manual mode or the automatic mode is selectable by the driver. In the manual mode, it is further possible to select a plurality of control modes with differing levels of intervention of the automatic control. In accordance with this feature, an appropriate manual engagement/disengagement shift control mode for a clutch can be selected depending on a plurality of uses, such as for people who wish to enjoy shifting by manual clutch operations, people who desire more practice, or the like.

In the present embodiment, the plurality of control modes having differing levels of intervention of the automatic control include at least a mode (comfort mode) having a driving assist control for reducing shocks at a time of engagement of the clutch, and a mode (direct mode) that allows shocks to occur at the time of engagement. In accordance with this feature, a mode in which the clutch operation can be comfortably performed, and a mode in which a precise clutch engagement/disengagement operation is required such as in circuit racing or the like can be selected according to various situations, such as the level of skill, the type of roadway, or the like.

According to the present embodiment, in the mode that allows shocks to occur at the time of engagement, a control is activated to avoid a specified limiting event in the state of the engine of the vehicle 10. In accordance with this feature, even in the mode in which a precise clutch engagement/disengagement operation is required, in the case of the predetermined limiting event, it is possible to assist driving by the driver, or to automatically provide protection to the vehicle.

In the present embodiment, one example of the aforementioned limiting event is an event to continue with half-clutching for a predetermined time period or greater. In accordance with this feature, the clutch can be appropriately protected, even in the mode in which a precise clutch engagement/disengagement operation is required.

In the present embodiment, the aforementioned limiting event is an event in which the engine rotational speed is less than or equal to a predetermined value. In accordance with this feature, it is possible to appropriately avoid an engine stop (so called engine stalling), even in the mode in which a precise clutch engagement/disengagement operation is required.

It may be decided not to avoid the limiting event as described above. For example, by allowing engine stalling to occur, the driver may be permitted to learn through experience.

Furthermore, according to the present embodiment, the driving skill determining device 200 is provided for determining the driving skill of the driver of the vehicle 10, and includes a clutch operation state detecting device (the clutch lever L, the clutch lever operation amount sensor SEL, and the capacity value storage unit 224) for detecting the clutch operation state by the driver, and a throttle operation state detecting device (the throttle opening sensor 103, the engine rotational speed sensor 130, and the engine rotational speed storage unit 226) for detecting the throttle operation state by the driver.

Consequently, by direct operations of the driver, it is possible to easily determine the driving skill of the driver including, for example, a driving skill such as a blipping operation.

In the present embodiment, the driving skill of the driver is determined on the basis of at least the situation of the change in the engine rotational speed of the vehicle 10, and information of the timing of the clutch operation by the driver. In accordance with this feature, it is possible for the driving skill to be determined directly from the timing of the clutch operation with respect to changes in the engine rotational speed, the timing of the clutch operation being likely to result in differences in the driving skill of the driver.

In the present embodiment, the driving skill of the driver is determined at least from the clutch operation and the throttle operation of the driver, which take place during a downshifting operation of the transmission (AMT) 1 by the driver. In accordance with this feature, it is possible for the driving skill to be determined directly from the clutch operation and the throttle operation during the downshifting operation which are likely to cause differences in the driving skill of the driver.

In the present embodiment, the driving skill of the driver is determined from at least a rise of the engine rotational speed due to a blipping operation performed during a downshifting operation, and the timing at which disengagement of the clutch by the clutch operation takes place. In accordance with this feature, it is possible for the driving skill of the driver to be determined directly from the downshifting operation, and the blipping operation performed during the downshifting operation.

In the present embodiment, the driving skill determining device 200 is incorporated in the automatic transmission control device 1 installed in the vehicle 10, and operates in accordance with a selection indication of the driver. In accordance with this feature, it is possible to determine the driving skill of the driver by effectively using a sensor or the like utilized in the automatic transmission control device 1.

In the present embodiment, the automatic transmission control device 1 enables either the automatic transmission mode or the manual transmission mode to be selected by the driver. Furthermore, in the manual transmission mode, it is possible to select the manual clutch operating mode, in which the driving skill determining device 200 is operated in accordance with the selection indication of the driver at a time when the manual clutch operating mode is selected. In accordance with this feature, it is possible to determine the driving skill of the driver in the manual clutch operating mode, by effectively using a sensor or the like utilized in the automatic transmission control device in which the manual clutch operating mode is capable of being selected.

In the present embodiment, the transmission control that is implemented when the skill determination is performed is a control (for example, in the direct mode) in which a portion of the automatic transmission control by the automatic transmission control device 1 (for example, a modification of the clutch connection timing, an automatic blipping control, etc., which are executed in the comfort mode) is not effected. The driving skill determining device 200 determines the driving skill of the driver by comparing a command derived by a control (for example, in the comfort mode) in which a portion of the aforementioned control is carried out under predetermined conditions, with a command issued by a control (in the direct mode), which is a control in which that portion is not carried out and is on the basis of a driving operation of the driver. In accordance with this feature, it is possible to determine the driving skill of the driver by effectively using the transmission control program and a sensor, etc., utilized in the automatic transmission device (AMT) 1.

In the present embodiment, a device (the determination result display processing unit 232) is provided for notifying the driver of the determination result of the driving skill of the driver. Consequently, it is possible to inform the driver appropriately concerning the driving skill determination result.

In the present embodiment, the determination result is notified to the driver by the behavior of the vehicle body at a time that a speed change (shifting) by the driver is carried out. In accordance with this feature, it is possible to notify the driver in a sensory manner (through bodily sensations) using the behavior of the vehicle body to indicate the determination result of the driving skill.

Further, a driving skill determination method according to the present embodiment includes a step of detecting a clutch operation state by the driver, and a step of detecting a throttle operation state by the driver. In accordance with this feature, it is possible to determine the driving skill of the driver by operations directly made by the driver.

The present invention is not limited to the above-described embodiment, and it is a matter of course that various modified or alternative configurations could be adopted therein without departing from the essence and gist of the present invention.

More specifically, the selection modes in accordance with the manual clutch operating mode are not limited to two modes, and two or more modes may be possessed thereby in stages depending on a proportion of driver assistance.

The limiting event is not restricted to being a half-clutching state for a prolonged time period or engine stalling, but may be any event concerned with offering driver assistance or protecting the components of the vehicle. For example, an unnecessary clutch disengagement operation may be avoided depending on road surface conditions such as freezing of the road surface or cornering, or the like.

The skill determination may be performed at times other than during downshifting. For example, a determination of the driver's skill may be performed at a time of starting movement or when upshifting.

In the above-described example, an example was shown which is applied to the vehicle 10 having the automatic transmission control device 1. However, since it suffices to include a clutch-by-wire device, and various sensors, and computation devices, such an example may be applied to vehicles that are not equipped with the automatic transmission control device 1.

The shift control may be performed in a direction in which the behavior of the driver at a time that a deviation in the shift timing occurs is further enlarged.

The skill determination may also be performed in the comfort mode. In this case, although the driver does not experience bodily sensations, it is possible to be conscious of the timing of the clutch lever operations on the display.

Also, concerning the bodily sensation of the vehicle body behavior, a haptic device may be utilized, such as one that causes the driver to physically sense a minor body behavior by controlling the clutch hydraulic pressure.

When displaying messages, rankings, etc., for the purpose of coaching the driver, such displays may be accompanied by a sound output.

What is claimed is:

1. A power transmission device for a vehicle equipped with a clutch lever and a clutch for disengagement of a driving force transmission between an engine and a driving wheel, the power transmission device for the vehicle comprising:
　　a manual mode in which the clutch is disengaged by a driver performing a disengagement operation with the clutch lever and
　　an automatic mode in which the clutch is disengaged, without the driver performing the disengagement operation, under the control of a control unit adapted to automatically control disengagement of the clutch,
　　wherein,
　　the manual mode or the automatic mode is selectable by the driver,
　　in the manual mode, it is further possible to select a plurality of control modes having differing levels of intervention of the automatic control,
　　the plurality of control modes having differing levels of intervention of the automatic control include at least a mode having a driving assist control for reducing shocks at a time of engagement of the clutch, and a mode that allows shocks to occur at the time of engagement,
　　in the mode that allows shocks to occur at the time of engagement, a control is activated to avoid a specified limiting event in the state of the engine of the vehicle.

2. The power transmission device for a vehicle according to claim 1, wherein the limiting event is an event to continue with half-clutching for a predetermined time period or greater.

3. The power transmission device for a vehicle according to claim 1, wherein the limiting event is an event in which an engine rotational speed is less than or equal to a predetermined value.

4. The power transmission device for a vehicle according to claim 1, wherein a driving skill determining device, which is operated in accordance with a selection indication of the driver, is incorporated in the control unit.

5. The power transmission device for a vehicle according to claim 4, wherein the driving skill determining device operates in accordance with the selection indication of the driver when the manual mode is selected.

\* \* \* \* \*